United States Patent
Okada et al.

(10) Patent No.: US 8,649,283 B2
(45) Date of Patent: Feb. 11, 2014

(54) PACKET ANALYSIS APPARATUS AND METHOD THEREOF

(75) Inventors: Sumiyo Okada, Kawasaki (JP);
Noriyuki Fukuyama, Kawasaki (JP);
Masanobu Morinaga, Kawasaki (JP);
Hideaki Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 267 days.

(21) Appl. No.: 12/814,811

(22) Filed: Jun. 14, 2010

(65) Prior Publication Data
US 2010/0322095 A1  Dec. 23, 2010

(30) Foreign Application Priority Data

Jun. 19, 2009  (JP) .................................. 2009-145938

(51) Int. Cl.
*G01R 31/08* (2006.01)
*H04L 1/00* (2006.01)

(52) U.S. Cl.
USPC ........... 370/252; 370/356; 370/412; 370/337; 455/452.2; 455/436; 704/208; 704/219

(58) Field of Classification Search
USPC .......... 370/252, 356, 412, 337; 704/233, 208, 704/214, 207, 219; 455/452.2, 436
See application file for complete search history.

(56) References Cited

U.S. PATENT DOCUMENTS

| | | | |
|---|---|---|---|
| 6,272,459 B1 * | 8/2001 | Takahashi | 704/221 |
| 6,629,070 B1 * | 9/2003 | Nagasaki | 704/233 |
| 6,847,821 B1 * | 1/2005 | Lewis et al. | 455/452.2 |
| 6,868,156 B1 * | 3/2005 | Narayan et al. | 379/386 |
| 2005/0243811 A1 * | 11/2005 | Jagadeesan | 370/356 |
| 2007/0064679 A1 * | 3/2007 | Chitturi | 370/352 |
| 2009/0170499 A1 * | 7/2009 | Vaisanen et al. | 455/423 |

FOREIGN PATENT DOCUMENTS

| | | |
|---|---|---|
| JP | 09-326772 | 12/1997 |
| JP | 11-259099 | 9/1999 |
| JP | 2003-249945 | 9/2003 |
| JP | 2005-311906 | 11/2005 |

* cited by examiner

*Primary Examiner* — Andrew Chriss
*Assistant Examiner* — Jamal Javaid
(74) *Attorney, Agent, or Firm* — Stass & Halsey LLP

(57) ABSTRACT

A method executed by a packet analysis apparatus for analyzing packets including voice packets and non-voice packets includes: capturing packets in a specific session; storing the captured packets in a storage; screening the stored packets to count up a receipt count of voice packets; determining whether packet loss has occurred in the specific session; and determining whether loss packets are voice packets in accordance with received packets adjacent to the loss packets to count up a loss count of voice packets when the packet loss has occurred.

5 Claims, 28 Drawing Sheets

| RTP HEADER | | | | RTP PAYLOAD | | |
|---|---|---|---|---|---|---|
| MARKER (M) BIT | PAYLOAD TYPE | SEQUENCE NUMBER | TIME STAMP | EVENT NUMBER | END (E) BIT | DURATION |

FIG. 7

CALCULATION RESULT
OF TRANSMISSION QUALITY

| | LOSS COUNT | LOSS RATE |
|---|---|---|
| IN WHOLE | 3 | 3 % |
| VOICE PACKETS | 1 | 1.1 % |
| DTMF PACKETS | 2 | 22.2 % |

FIG. 8

```
<caller-side>
<first-packet>1225270635.380247</first-packet>
<loss-packet>7</loss-packet>
<recv-packet>93</recv-packet>
⋮
<loss-rate-max>7.000000</loss-rate-max>
<loss-rate-min>7.000000</loss-rate-min>
<loss-rate-avg>7.000000</loss-rate-avg>
<loss-rate-err>2</loss-rate-err>
⋮
<dtmf>
⋮
<voice-recv-packet>45</voice-recv-packet>
<voice-loss-packet>5</voice-loss-packet>
<voice-loss-rate-max>10.000000</voice-loss-rate-max>
<voice-loss-rate-min>0.000000</voice-loss-rate-min>
<voice-loss-rate-avg>10.000000</voice-loss-rate-avg>
<dtmf-recv-packet>48</dtmf-recv-packet>
<dtmf-loss-packet>2</dtmf-loss-packet>
<dtmf-loss-rate-max>4.000000</dtmf-loss-rate-max>
<dtmf-loss-rate-min>0.000000</dtmf-loss-rate-min>
<dtmf-loss-rate-avg>4.000000</dtmf-loss-rate-avg>
<unknown-loss-packet>0</unknown-loss-packet>
⋮
```

- DATA ON LOSS PACKETS IN WHOLE (first-packet, loss-packet, recv-packet, loss-rate-max/min/avg/err)
- DATA ON VOICE LOSS PACKETS (voice-recv-packet, voice-loss-packet, voice-loss-rate-max/min/avg)
- DATA ON DTMF LOSS PACKETS (dtmf-recv-packet, dtmf-loss-packet, dtmf-loss-rate-max/min/avg)
- DATA ON UNKNOWN LOSS PACKETS (unknown-loss-packet)

FIG. 9

| MARKER (M) BIT | PAYLOAD TYPE | SEQUENCE No. | TIME STAMP | EVENT No. | END (E) BIT | DURATION |
|---|---|---|---|---|---|---|
| 1 | 101 | 1 | 160 | 5 | 0 | 160 |
| 0 | 101 | 2 | 320 | 5 | 0 | 320 |
| 0 | 101 | 3 | 480 | 5 | 0 | 480 |
| 0 | 101 | 4 | 640 | 5 | 1(0 or 1) | 640 |
| 0 | 101 | 5 | 800 | 5 | 1 (always) | 640 |
| 0 | 101 | 6 | 960 | 5 | 1 (always) | 640 |

ONE EVENT

FIG. 11

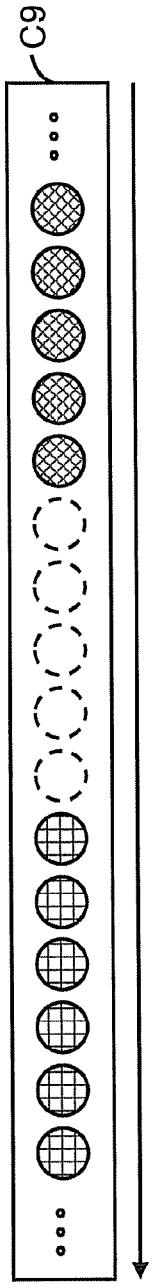
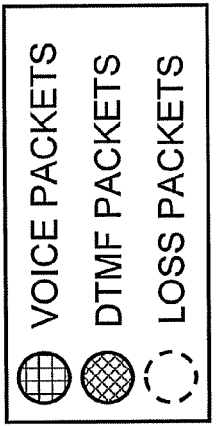
FIG. 19
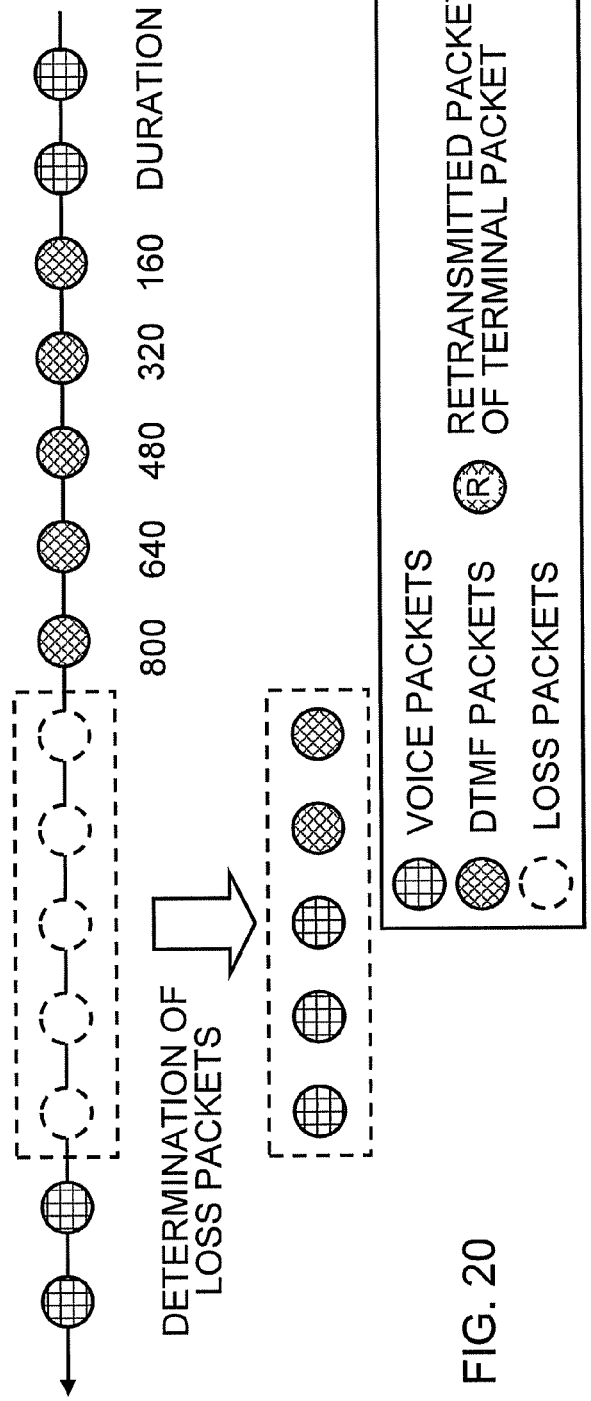
FIG. 20

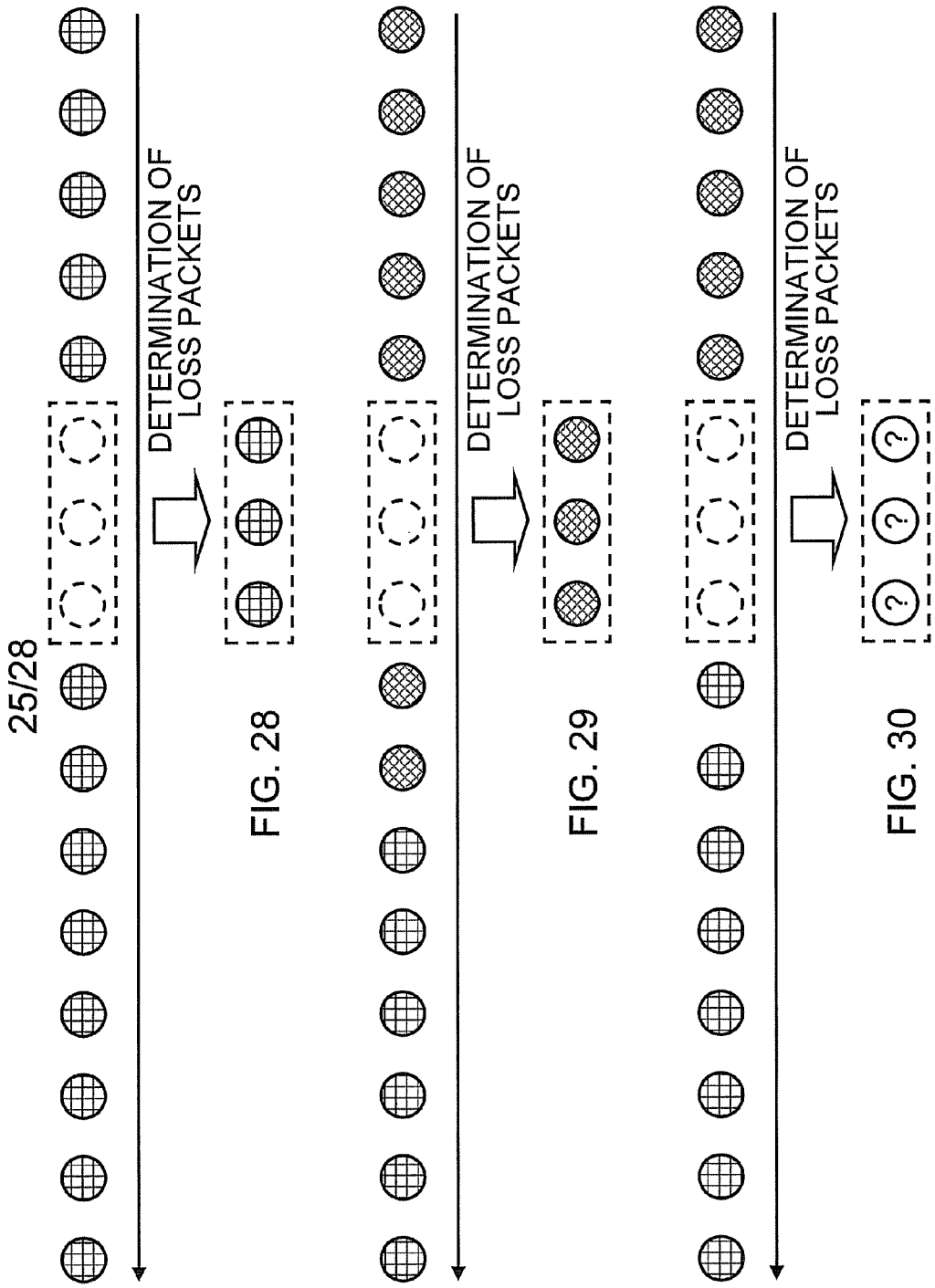

PACKET ANALYSIS APPARATUS AND METHOD THEREOF

CROSS-REFERENCE TO RELATED APPLICATION

This application is based upon and claims the benefit of priority of the prior Japanese Patent Application No. 2009-145938, filed on Jun. 19, 2009, the entire contents of which are incorporated herein by reference.

FIELD

The embodiments discussed herein are related to a packet analysis technique.

BACKGROUND

With the developments in information communication technologies, bi-directional communication via packet communication networks has been in widespread use. In particular, Internet protocol (IP) telephones that facilitate voice communication via an IP network (e.g., the Internet) have been in widespread use. Such IP telephones employ a voice over Internet protocol (VoIP) in which packetized voice data is transmitted and received via a packet communication network. Accordingly, it is important for service providers that provide an IP telephone service to monitor and manage the quality of voice of an IP telephone.

In order to measure the quality of voice of an IP telephone, a technique of calculating a loss rate of packets per unit time in each of real-time transport protocol (RTP) sessions has been developed. For example, as illustrated in FIG. 33, an amount (referred to as a receipt count of packets) of received packets and an amount (referred to as a loss count of packets) of loss packets per predetermined period of time are counted up, and the loss rate of packets is calculated. Note that in FIG. 33, circles with a solid outline represent received packets, and circles with a dotted outline represent loss packets. In addition, FIG. 33 illustrates a case in which three packets (packets having sequence numbers of 4, 11, and 15) out of one hundred packets have been lost. Thus, the loss rate of packets is 3.0%. Note that it may be determined whether a packet is lost by monitoring the sequence number contained in each of the packets.

Related techniques are disclosed in Japanese Laid-Open Patent Publication No. 2003-249945 and Japanese Laid-Open Patent Publication No. 11-259099.

SUMMARY

According to an aspect of the present invention, provided is a method executed by a packet analysis apparatus for analyzing packets including voice packets and non-voice packets. The method includes: capturing packets in a specific session; storing the captured packets in a storage; screening the stored packets to count up a receipt count of voice packets; determining whether packet loss has occurred in the specific session; and determining whether loss packets are voice packets in accordance with received packets adjacent to the loss packets to count up a loss count of voice packets when the packet loss has occurred.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a data format of an RTP packet;

FIG. 8 is a diagram illustrating an example of a screen for displaying a calculation result of transmission quality according to an embodiment of the present invention;

FIG. 9 is a diagram illustrating an example of log data of transmission quality according to an embodiment of the present invention;

FIG. 11 is a diagram illustrating an example of information contained in DTMF packets included in a DTMF event;

FIG. 19 is a diagram illustrating an example of a case in which retransmitted packets have been lost;

FIG. 20 is a diagram illustrating an example of a loss packet estimation process according to an embodiment of the present invention;

FIG. 28 is a diagram illustrating an example of a case in which both previous and next packets to loss packets are voice packets;

FIG. 29 is a diagram illustrating an example of a case in which both previous and next packets to loss packets are DTMF packets;

FIG. 30 is a diagram illustrating an example of a case in which previous and next packets to loss packets are packets of different types;

DESCRIPTION OF EMBODIMENTS

In voice communication using IP telephones, a dual-tone multi frequency (DTMF) signal, which is a non-voice signal, may flow in addition to a voice signal in a network. That is, both a voice signal and a DTMF signal (i.e., a non-voice signal) may flow in the same RTP session.

However, in the conventional techniques, non-voice signals and voice signals are analyzed without being separated from each other when the quality of voice is measured. In addition, it may be difficult in conventional techniques to determine whether the loss packets are voice packets or non-voice packets. That is, in conventional techniques, when voice packets and non-voice packets flow in the same RTP session, it is difficult to measure the transmission quality of voice packets, which gives an indication of the quality of voice, by substantially eliminating the influence of the non-voice packets.

Accordingly, it is preferable to provide a method for measuring the transmission quality of voice packets by substantially eliminating the influence of the non-voice packets.

Figure 1:
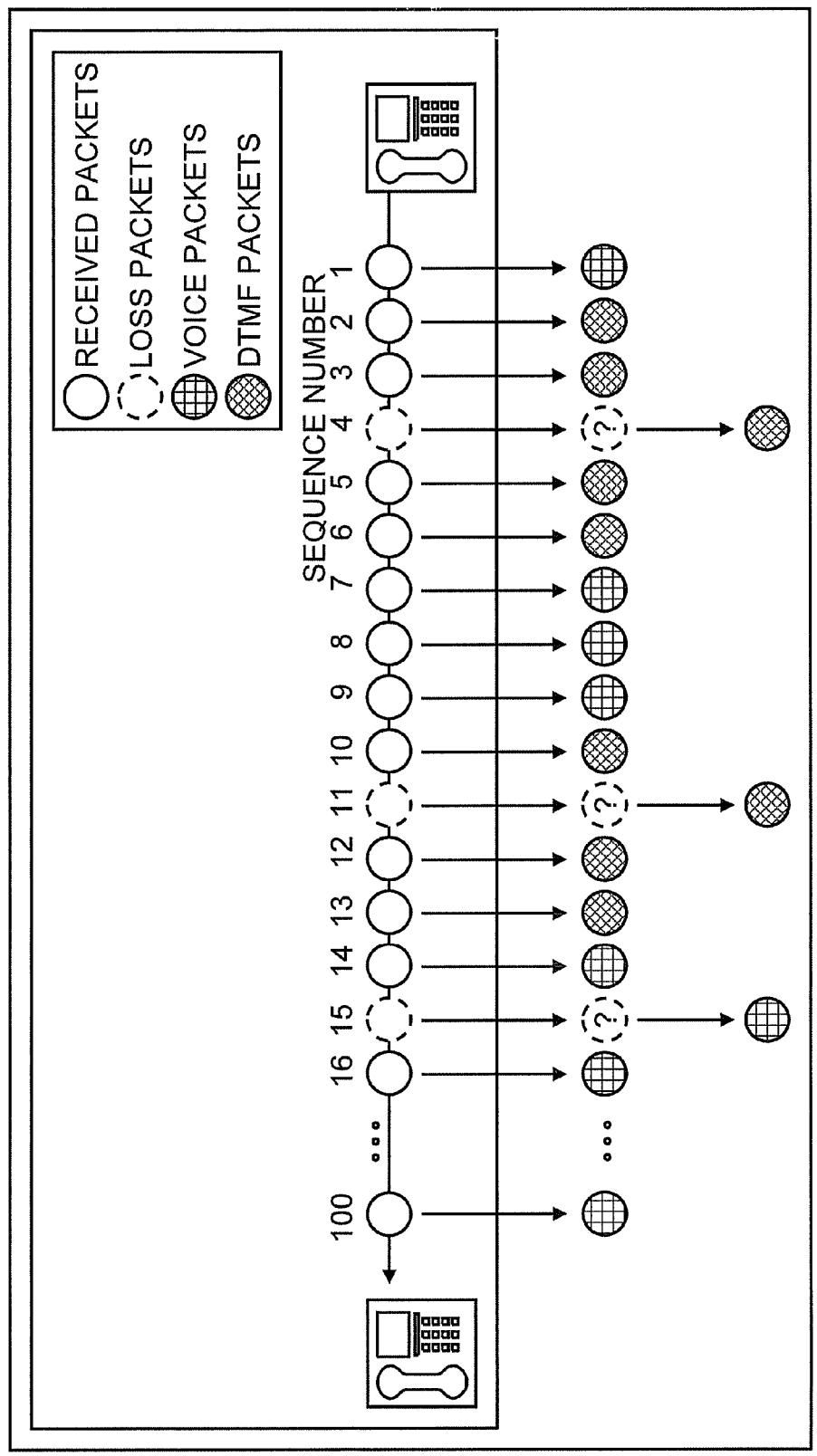
FIG. 1 is a diagram illustrating an embodiment of the present invention.
Figure 2:
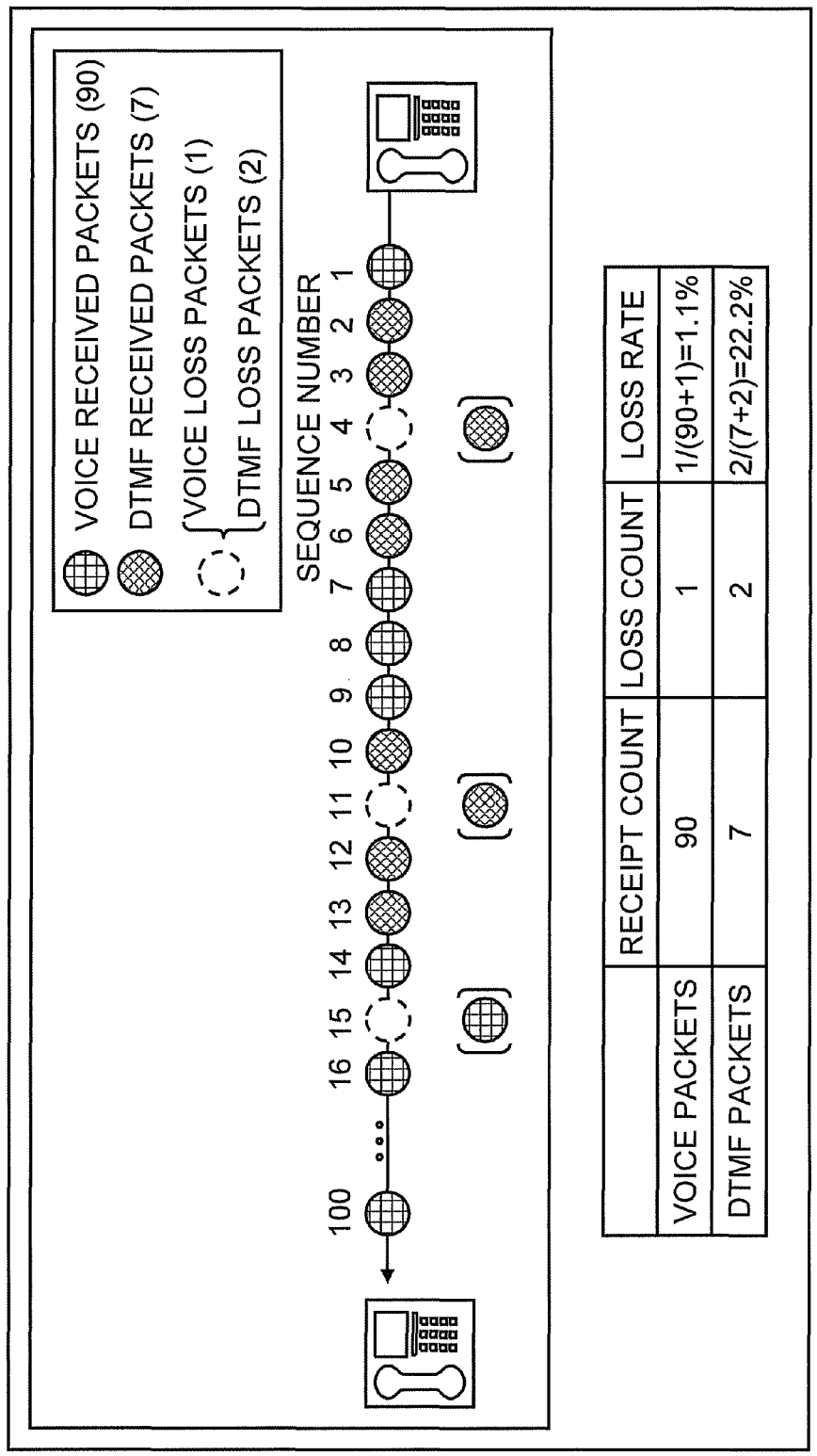
FIG. 2 is a diagram illustrating an embodiment of the present invention.

The outline of embodiments of the present invention will be discussed first with reference to FIGS. 1 and 2. FIG. 1 illustrates an example of a series of packets that flow between IP telephones via a packet communication network. FIG. 2 illustrates an example of loss packet estimation. According to the embodiments of the present invention, a packet analysis apparatus captures packets flowing in an RTP session and determines, in accordance with the payload type included in the packets, what type of packets the captured packets are. In addition, according to the embodiments, the packet analysis apparatus determines whether packet loss has occurred and determines the type of loss packets when packet loss has occurred. Sequential sequence numbers are assigned to packets that flow in an RTP session. This allows the packet analysis apparatus to determine whether packets have been lost in accordance with the sequence numbers contained in the packets. In this way, for example, as illustrated in FIG. 2, the packet analysis apparatus may count up an amount (referred to as a receipt count of voice packets) of received voice packets and an amount (referred to as a loss count of voice packets) of voice loss packets and, therefore, the packet analysis apparatus may calculate the loss rate of voice packets by substantially eliminating the influence of the non-voice packets. In FIG. 2, three packets (the packets having sequence numbers of 4, 11, and 15) out of one hundred packets have been lost. The three loss packets include one voice packet and two DTMF packets (i.e., non-voice packets). Accordingly, in the example illustrated in FIG. 2, the loss rate of voice packets may be calculated as follows:

$$1/(90+1) \approx 1.1\%$$

Note that in FIGS. 1 and 2, circles with a solid outline represent received packets, and circles with a dotted outline represent loss packets. In addition, circles with a lattice pattern represent voice packets, and diagonally hatched circles represent DTMF packets (the same applies to the subsequent drawings). The embodiments will be discussed in more detail below.

First Embodiment

Figure 3:
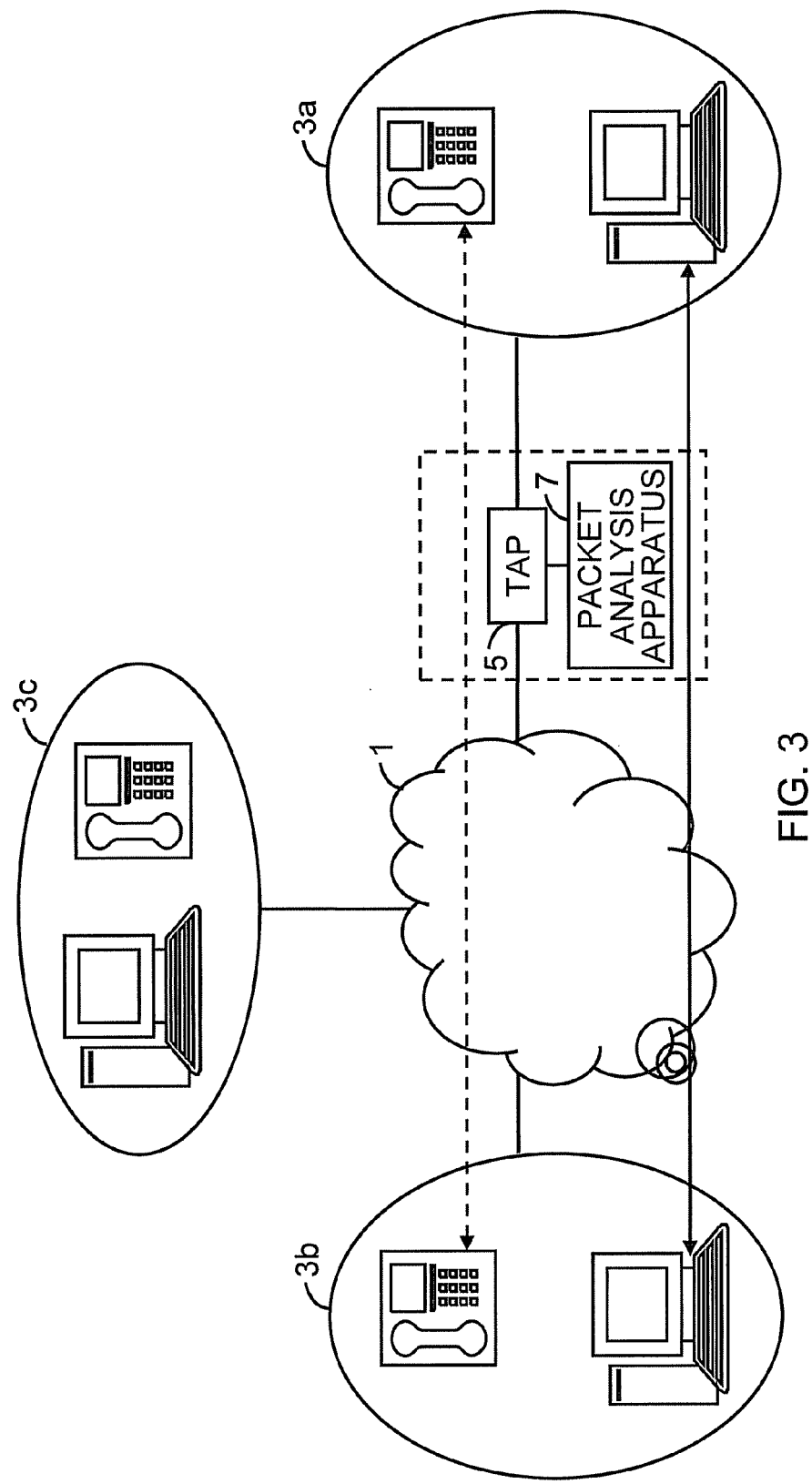
FIG. 3 is a diagram illustrating an example of a system according to an embodiment of the present invention.

A first embodiment of the present invention will be discussed next with reference to FIGS. 3 to 14, 31, and 32. FIG. 3 illustrates an example of a system according to the present embodiment. As illustrated in FIG. 3, networks 3a, 3b, and 3c connect to a packet communication network 1. In addition, an IP telephone and a personal computer (PC) connect to respective networks 3a, 3b, and 3c. For example, voice communication between the IP telephones and data communication between the PCs may be performed via the networks 3a, 3b, and 3c, and the packet communication network 1. As illustrated in FIG. 3, a monitoring point is provided between the packet communication network 1 and the network 3a. The network 3a connects to the packet communication network 1 through a tap 5 installed at the monitoring point. Furthermore, a packet analysis apparatus 7 is installed at the monitoring point. The packet analysis apparatus 7 captures, via the tap 5, a packet that passes through the monitoring point. While a single monitoring point is provided in FIG. 3, a plurality of monitoring points may be provided.

Figure 32:
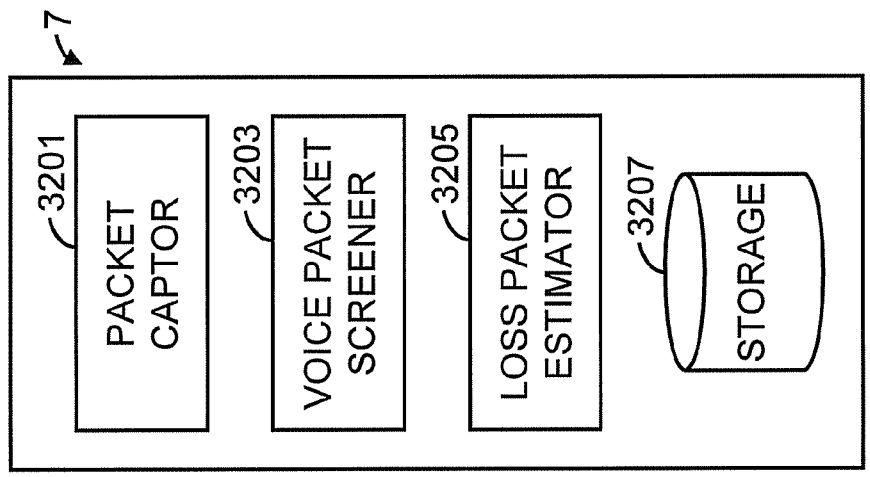
FIG. 32 is a diagram illustrating an example of a functional configuration of a packet analysis apparatus according to an embodiment of the present invention.
Figure 31:
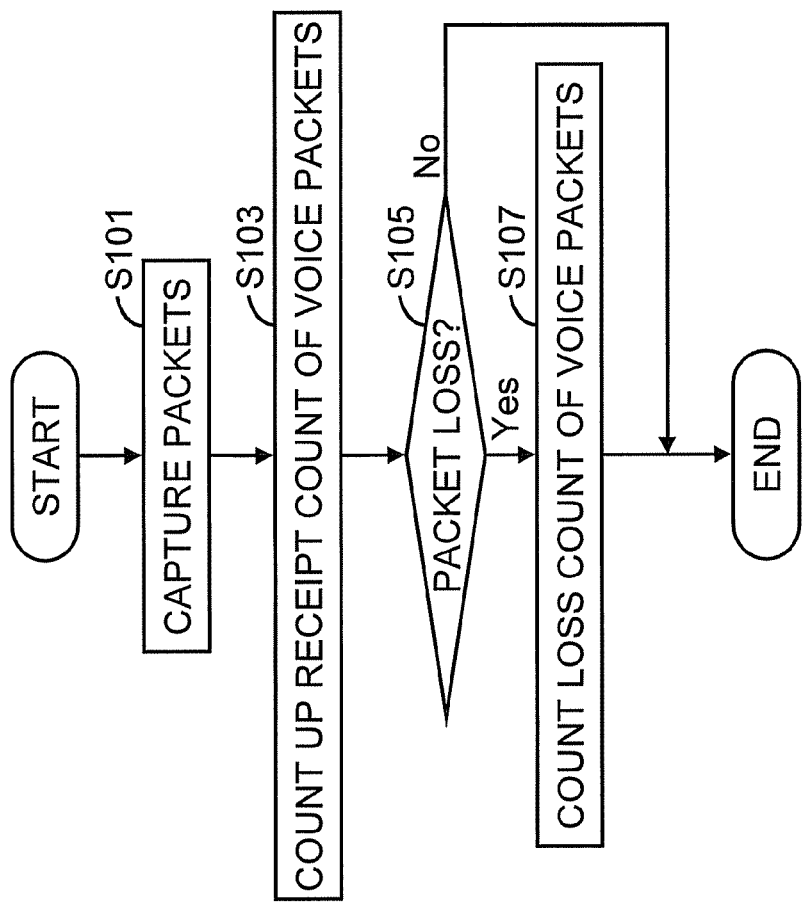
FIG. 31 is a diagram illustrating an example of an operation flow of a process performed by a packet analysis apparatus according to an embodiment of the present invention.
Figure 33:
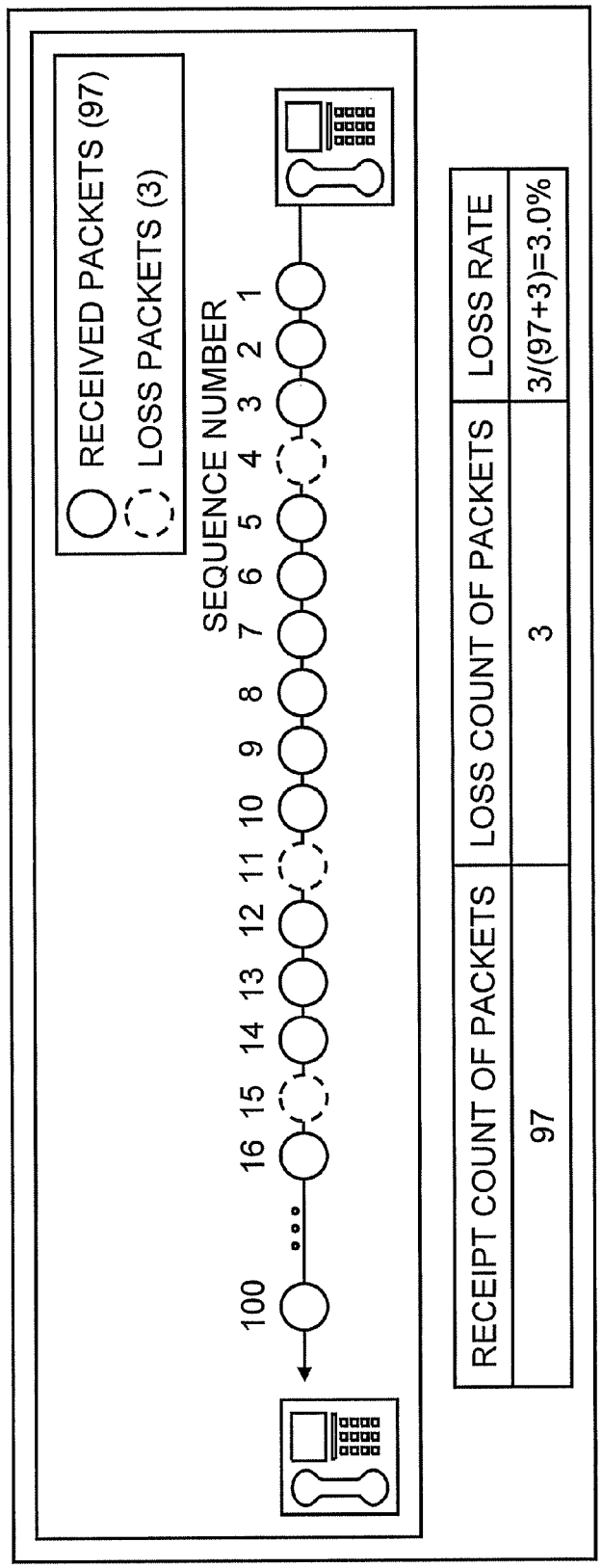
FIG. 33 is a diagram illustrating an example of a related technology.

FIG. 32 illustrates an example of a functional configuration of the packet analysis apparatus 7 according to the present embodiment. As illustrated in FIG. 32, the packet analysis apparatus 7 includes a packet captor 3201 for capturing packets, a voice packet screener 3203 for screening voice packets, a loss packet estimator 3205 for counting an amount of voice loss packets, and a storage 3207 for storing captured packets and other data. FIG. 31 illustrates an operation flow of a process performed by the packet analysis apparatus 7 according to the present embodiment.

In operation S101, the packet captor 3201 captures packets.

In operation S103, the voice packet screener 3203 counts up receipt count of voice packets.

In operation S105, the loss packet estimator 3205 determines whether packet loss has occurred.

In operation S107, the loss packet estimator 3205 counts up loss count of voice packets.

Figures 4, 5:
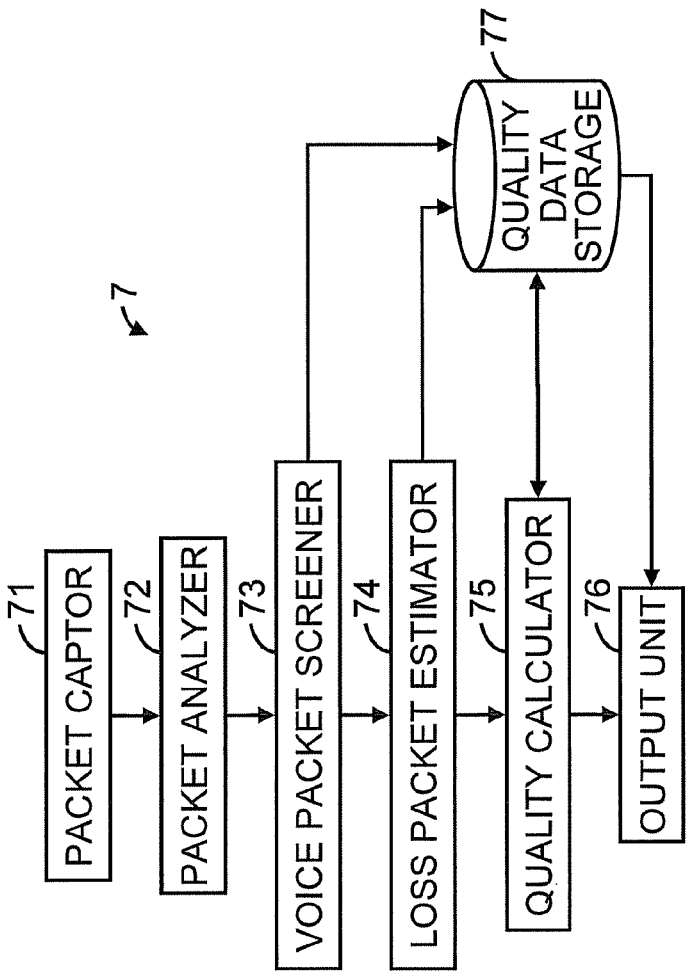
FIG. 4 is a diagram illustrating an example of a functional configuration of a packet analysis apparatus according to an embodiment of the present invention.
FIG. 5 is a diagram illustrating an example of data stored in a quality data storage according to an embodiment of the present invention.

FIG. 4 illustrates an example of a detailed functional configuration of the packet analysis apparatus 7 according to the present embodiment. In FIG. 4, the packet analysis apparatus 7 includes a packet captor 71, a packet analyzer 72, a voice packet screener 73, a loss packet estimator 74, a quality calculator 75, an output unit 76, and a quality data storage 77.

The packet captor 71 captures, using the tap 5, a packet that flows through the monitoring point and outputs the captured packet to the packet analyzer 72. Upon receiving the packet from the packet captor 71, the packet analyzer 72 analyzes the header of the packet to determine whether the packet is an RTP packet. When the packet is an RTP packet, the packet analyzer 72 stores the RTP packet in a storage unit (not illustrated). The packet analyzer 72 instructs the voice packet screener 73 to determine whether the stored packets are voice packets or DTMF packets. Upon receiving the instruction from the packet analyzer 72, the voice packet screener 73 determines whether each of the packets stored in the storage unit is a voice packet or a DTMF packet in accordance with the payload type included in the header of the packet and counts up a receipt count of voice packets and an amount (referred to as a receipt count of DTMF packets) of received DTMF packets. The voice packet screener 73 stores the receipt count of voice packets and the receipt count of DTMF packets in the quality data storage 77. In addition, the voice packet screener 73 instructs the loss packet estimator 74 to start a loss packet estimation process discussed below. Upon receiving the instruction from the voice packet screener 73, the loss packet estimator 74 determines whether packet loss has been occurred in accordance with the packets stored in the storage unit. Upon determining that packet loss has been occurred, the loss packet estimator 74 performs the loss packet estimation process to count up a loss count of voice packets and an amount (referred to as a loss count of DTMF packets) of DTMF loss packets respectively. The loss packet estimator 74 stores the loss count of voice packets and the loss count of DTMF packets in the quality data storage 77. Furthermore, the loss packet estimator 74 instructs the quality calculator 75 to calculate the transmission quality in terms of a loss rate of packets and an arrival rate of packets, for example. Upon receiving the instruction from the loss packet estimator 74, the quality calculator 75 calculates the transmission quality of voice packets and DTMF packets in accordance with the receipt count of packets and the loss count of packets stored in the quality data storage 77 and stores the calculated transmission quality of voice packets and DTMF packets in the quality data storage 77. In addition, the quality calculator 75 instructs the output unit 76 to output the quality data stored in the quality data storage 77. Upon receiving the instruction from the quality calculator 75, the output unit 76 generates output data in accordance with the data stored in the quality data storage 77 to display the output data on a display unit or transmits the output data to a user terminal (not illustrated).

FIG. 5 illustrates an example of data stored in the quality data storage 77 according to the present embodiment. In the example illustrated in FIG. 5, the quality data storage 77 stores respective receipt counts, loss counts, and loss rates of voice packets and DTMF packets. The quality data storage 77 may further store respective arrival rates of voice packets and DTMF packets, and an amount (referred to as a loss count of unknown packets) of unknown loss packets. The quality data storage 77 stores the data illustrated in FIG. 5 for each of RTP sessions. If the transmission quality is measured at predetermined time intervals, the quality data storage 77 may store the quality data for each of the time intervals. In the present embodiment, the quality data storage 77 stores not only data on voice packets but also data on all packets, data on DTMF packets, and data on unknown packets. However, the quality data storage 77 may store only data on voice packets. Alternatively, the quality data storage 77 may store data on voice packets and only one of data on all packets, data on DTMF packets, and data on unknown packets. This also applies to other embodiments.

Figure 6:
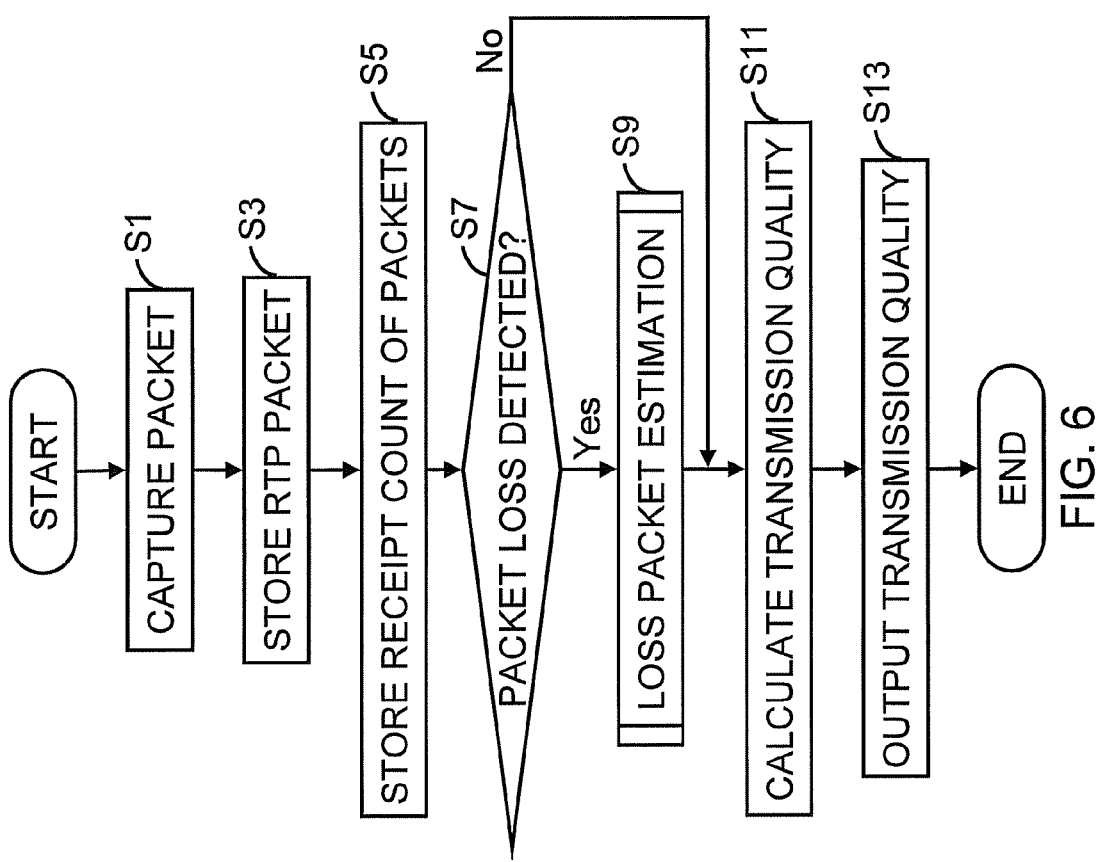
FIG. 6 is a diagram illustrating an example of an operation flow of an entire process performed by a packet analysis apparatus according to an embodiment of the present invention.

An example of a process performed by the packet analysis apparatus 7 according to the first embodiment will be discussed next with reference to FIGS. 6 to 14. FIG. 6 illustrates an example of an operation flow of an entire process performed by the packet analysis apparatus 7 according to the present embodiment.

In operation S1, the packet captor 71 captures, using the tap 5, a packet that flows in the network and outputs the captured packet to the packet analyzer 72.

In operation S3, upon receiving the packet from the packet captor 71, the packet analyzer 72 determines whether the packet is an RTP packet. When the packet is an RTP packet, the packet analyzer 72 stores the RTP packet in the storage unit. The packet analyzer 72 instructs, at predetermined time intervals or at any time, the voice packet screener 73 to determine whether the stored packets are voice packets or DTMF packets. For example, if it is decided in advance that the transmission quality is to be measured at certain time intervals, the packet analyzer 72 sends the instruction at the certain time intervals.

In operation S5, upon receiving the instruction from the packet analyzer 72, the voice packet screener 73 determines whether each of the RTP packets stored in the storage unit is a voice packet or a DTMF packet in accordance with the payload type included in the header of the RTP packet and counts up a receipt count of voice packets and a receipt count of DTMF packets. The voice packet screener 73 stores the receipt count of voice packets and the receipt count of DTMF packets in the quality data storage 77. If, for example, it is decided in advance that the transmission quality is to be measured at certain time intervals, the voice packet screener 73 makes determination for packets captured after the previous determination and counts up the receipt count of packets.

FIG. 7 illustrates an example of a data format of an RTP packet. The RTP packet illustrated in FIG. 7 is a DTMF packet. As illustrated in FIG. 7, the RTP packet includes an RTP header and an RTP payload. The RTP header includes a marker (M) bit, a payload type, a sequence number, and a time stamp. The RTP payload includes an event number, an end (E) bit, and a duration. Note that, only data items relating to the process according to the present embodiment are illustrated in FIG. 7. Since the RTP packet is the same as a conventional RTP packet, detailed discussion thereof will be omitted.

The voice packet screener 73 instructs the loss packet estimator 74 to start a loss packet estimation process.

In operation S7, upon receiving the instruction from the voice packet screener 73, the loss packet estimator 74 determines whether packet loss has been occurred in accordance with the sequence numbers of the packets stored in the storage unit.

In operation S9, when the loss packet estimator 74 has detected packet loss ("Yes" in operation S7), the loss packet estimator 74 performs a loss packet estimation process in accordance with the packets stored in the storage unit. The loss packet estimation process will be discussed later in more detail. By performing the loss packet estimation process, the loss packet estimator 74 counts up a loss count of voice packets and a loss count of DTMF packets and stores the loss count of voice packets and the loss count of DTMF packets in the quality data storage 77. Upon completing the loss packet estimation process, the loss packet estimator 74 instructs the quality calculator 75 to calculate the transmission quality in terms of a loss rate of packets and an arrival rate of packets, for example. Thereafter, the packet analysis apparatus 7 advances the process to operation S11.

When the loss packet estimator 74 has not detected packet loss ("No" in operation S7), the packet analysis apparatus 7 skips operation S9 and advances the process to operation S11. The loss packet estimator 74 instructs the quality calculator 75 to calculate the transmission quality in terms of a loss rate of packets and an arrival rate of packets, for example.

In operation S11, upon receiving the instruction from the loss packet estimator 74, the quality calculator 75 calculate the transmission quality in terms of a loss rate of packets and an arrival rate of packets in accordance with the receipt count of packets and the loss count of packets stored in the quality data storage 77 and stores the calculated transmission quality in the quality data storage 77. For example, when the receipt count of packets and the loss count of packets stored in the quality data storage 77 are as illustrated in FIG. 5, the loss rate of voice packets is calculated as follows: 1/(90+1)≈1.1%, and the loss rate of DTMF packets is calculated as follows: 2/(7+2)≈22.2%. When the loss rate of packets in whole and the arrival rate of packets in whole are needed, the quality calculator 75 calculates the loss rate of packets in whole and the arrival rate of packets in whole, and stores the rates in the quality data storage 77. If it is decided in advance that the transmission quality is to be measured at certain time intervals, the quality calculator 75 may calculate an average value of the loss rates of packets and an average value of the arrival rates of packets. Thereafter, the quality calculator 75 instructs the output unit 76 to output the quality data stored in the quality data storage 77.

In operation S13, upon receiving the instruction from the quality calculator 75, the output unit 76 generates, in accordance with the data stored in the quality data storage 77, screen data representing the calculation result of the transmission quality and displays the screen data on, for example, a display unit. FIG. 8 illustrates an example of a screen for displaying a calculation result of transmission quality according to the present embodiment. The screen illustrated in FIG. 8 is displayed, for example. In the screen for displaying the calculation result of the transmission quality illustrated in FIG. 8, the total count of loss packets, the loss rate of packets in whole, the loss count of voice packets, the loss rate of voice packets, the loss count of DTMF packets, and the loss rate of DTMF packets are displayed. Although not illustrated in FIG. 8, the loss count of unknown packets may be displayed. According to the present embodiment, in addition to data on voice packets, data on all packets and DTMF packets are displayed on the screen for displaying the calculation result of the transmission quality. However, only data on voice packets may be displayed. Alternatively, data on voice packets and only one of data on all packets, data on DTMF packets, and data on unknown packets may be displayed. This also applies to other embodiments.

If it is determined in advance that the transmission quality is to be measured at certain time intervals, the quality calculator 75 may generate log data of the measured transmission quality and store the generated log data in the quality data storage 77. FIG. 9 illustrates an example of log data of transmission quality according to the present embodiment. The example of log data illustrated in FIG. 9 includes data on loss packets in whole, data on voice loss packets, data on DTMF loss packets, and data on unknown loss packets. The data on loss packets in whole includes the loss count ("loss-packet" in FIG. 9) of packets, the receipt count ("recv-packet" in FIG. 9) of packets, the maximum ("loss-rate-max" in FIG. 9) of the measured loss rates, the minimum ("loss-rate-min" in FIG. 9) of the measured loss rates, and the average ("loss-rate-avg" in FIG. 9) of the measured loss rates. The data on voice loss packets includes the receipt count ("voice-recv-packet" in FIG. 9) of voice packets, the loss count ("voice-loss-packet" in FIG. 9) of voice packets, the maximum ("voice-loss-rate-max" in FIG. 9) of the measured voice loss rates, the minimum ("voice-loss-rate-min" in FIG. 9) of the measured voice loss rates, and the average ("voice-loss-rate-avg" in FIG. 9) of the measured voice loss rates. The data on DTMF loss packets includes the receipt count ("dtmf-recv-packet" in FIG. 9) of DTMF packets, the loss count ("dtmf-loss-packet" in FIG. 9) of DTMF packets, the maximum ("dtmf-loss-rate-max" in FIG. 9) of the measured DTMF loss rates, the minimum ("dtmf-loss-rate-min" in FIG. 9) of the measured DTMF loss rates, and the average ("dtmf-loss-rate-avg" in FIG. 9) of the measured DTMF loss rates. The data on unknown loss packets includes the loss count ("unknown-loss-packet" in FIG. 9) of unknown packets.

Figure 10:
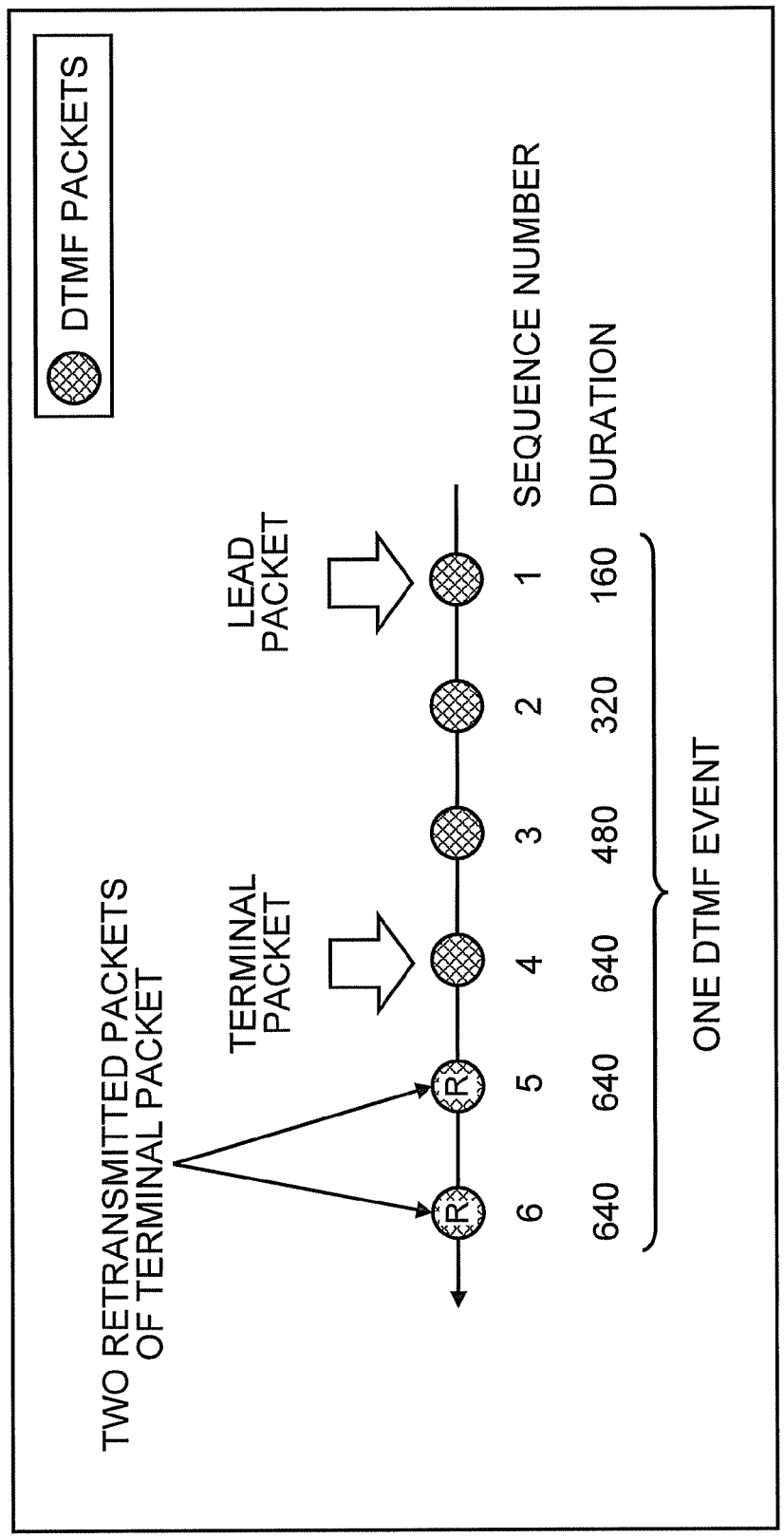
FIG. 10 is a diagram illustrating an example of a DTMF event.
Figure 12:
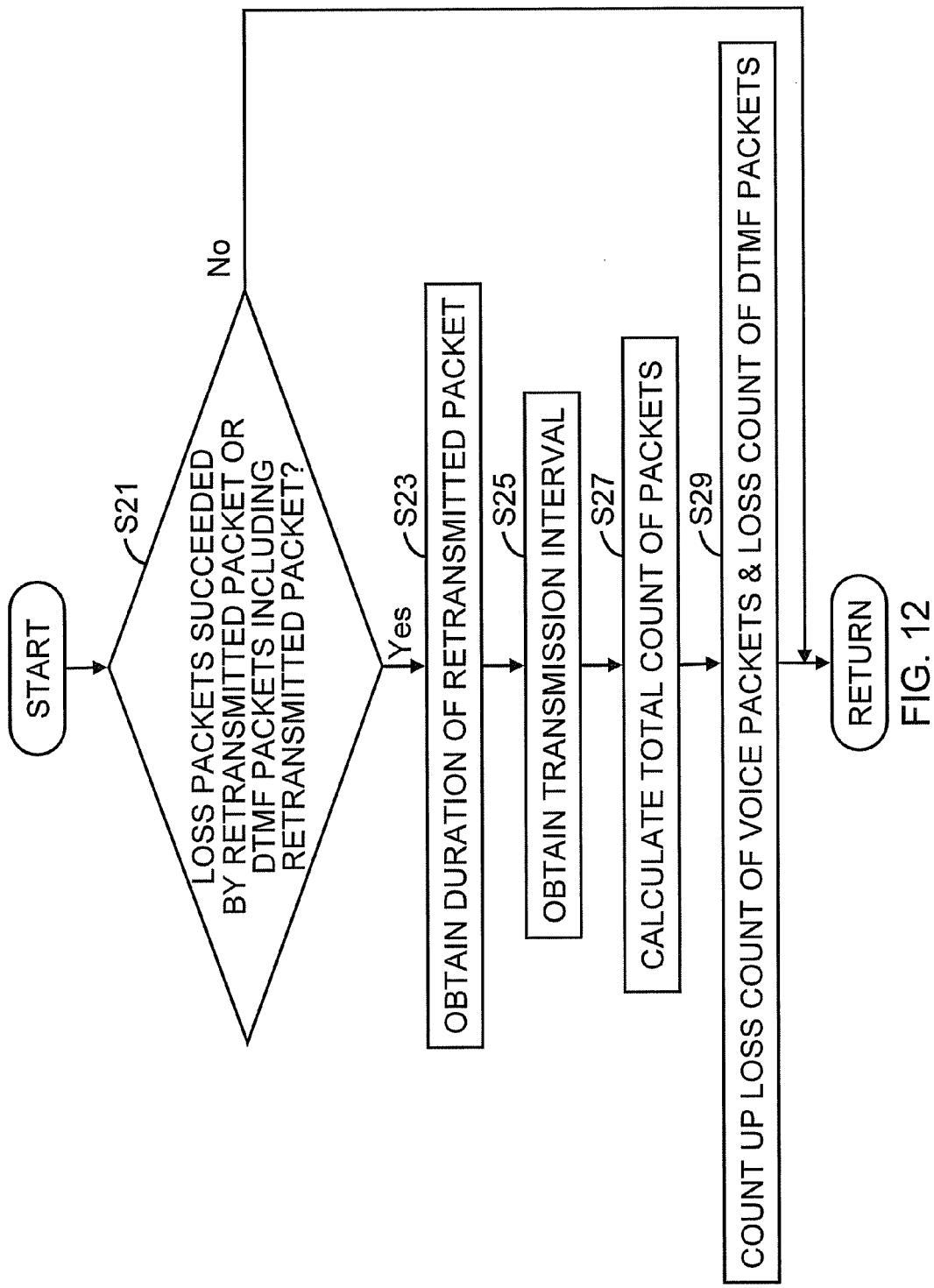
FIG. 12 is a diagram illustrating an example of an operation flow of a loss packet estimation process according to an embodiment of the present invention.

An example (referred to as a first loss packet estimation process) of a loss packet estimation process performed in operation S9 illustrated in FIG. 6 will be discussed next with reference to FIGS. 10 to 14. Before discussing the operation flow in detail, a DTMF event and a DTMF packet will be discussed. A DTMF event is generated for each of push tones and includes a plurality of DTMF packets. FIG. 10 illustrates a DTMF event generated when a button "5" is pressed. FIG. 11 illustrates information contained in each of six DTMF packets illustrated in FIG. 10. In a DTMF signaling, as illustrated in FIG. 10, a terminal packet is retransmitted twice. A series of DTMF packets (six DTMF packets in FIG. 10) including the packets (hereinafter referred to as retransmitted packets) to be retransmitted form a DTMF event. Note that, in FIG. 10, diagonally hatched circles with a letter "R" represent retransmitted packets (the same applies to the subsequent drawings). The end (E) bit of the retransmitted packet is always set to "1". The value for the duration of the retransmitted packet is set to the value for the duration of the terminal packet, as illustrated in FIGS. 10 and 11. The duration is an elapsed time measured from when the push button is pressed and is represented by a time stamp. Under such definitions, the first loss packet estimation process according to the present embodiment will be discussed in detail with reference to FIG. 12. FIG. 12 illustrates an operation flow of the first loss packet estimation process according to the present embodiment.

In operation S21, the loss packet estimator 74 determines, in accordance with the packets stored in the storage unit, whether there are loss packets succeeded by a retransmitted packet or by a group of DTMF packets including a retransmitted packet. That is, the loss packet estimator 74 determines whether the first half or the middle of the DTMF event is lost. The determination is made in accordance with the payload type, the end (E) bit, and the duration of each of the packet stored in the storage unit.

Figure 13:
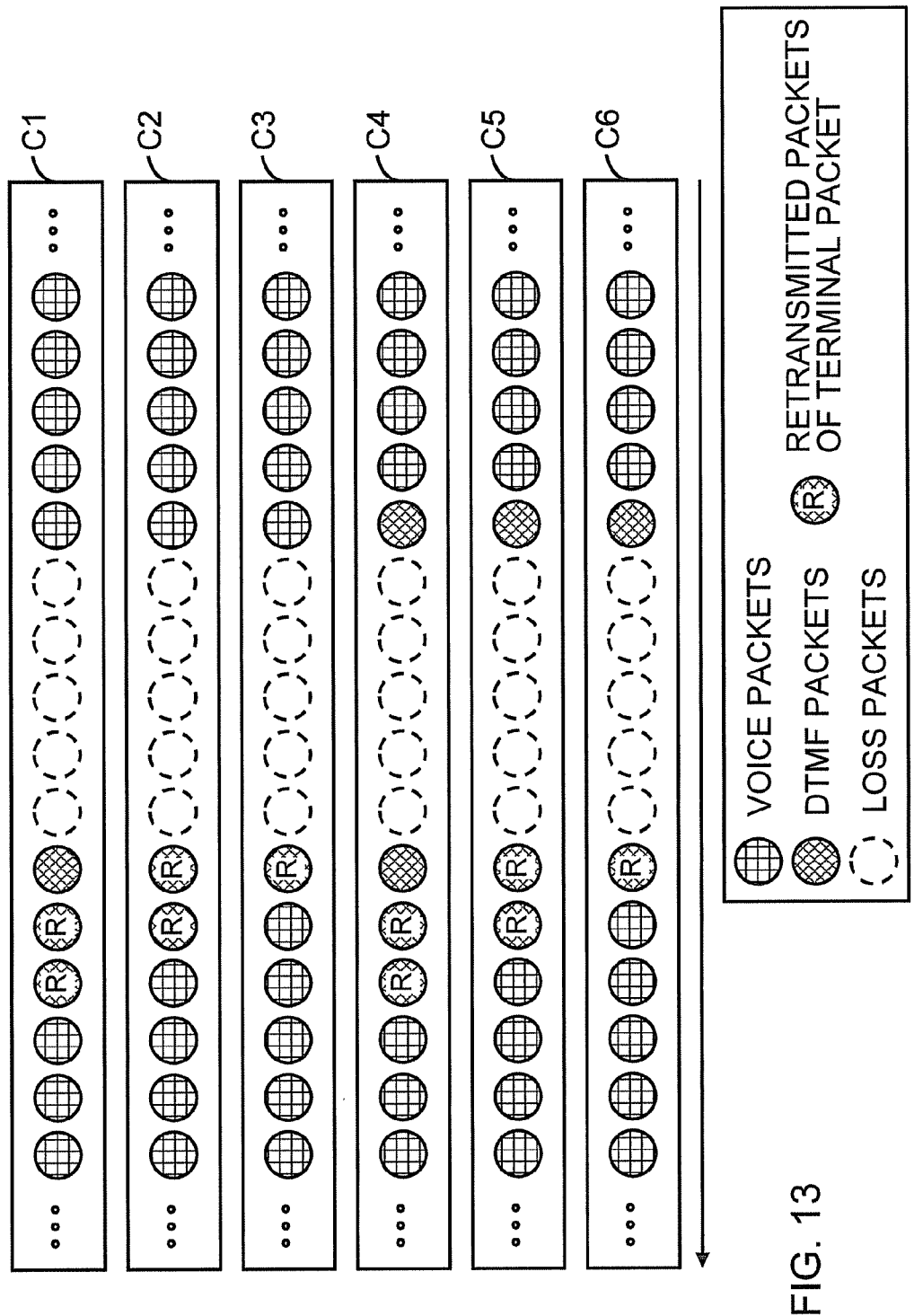
FIG. 13 is a diagram illustrating an example of cases in which a first half or a middle of a DTMF event is lost.

FIG. 13 illustrates cases in which a first half or a middle of a DTMF event has been lost. Note that in each of the cases illustrated in FIG. 13, the sequence numbers are assigned to the DTMF packets in ascending order from right to left. In case C1, there are loss packets succeeded by three DTMF packets (two of them are retransmitted packets) and preceded by a voice packet. In case C2, there are loss packets succeeded by two retransmitted packets and preceded by a voice packet. In case C3, there are loss packets succeeded by one retransmitted packet and preceded by a voice packet. In case C4, there are loss packets succeeded by three DTMF packets (two of them are retransmitted packets) and preceded by a DTMF packet. In case C5, there are loss packets succeeded by two retransmitted packets and preceded by a DTMF packet. In case C6, there are loss packets succeeded by one retransmitted packet and preceded by a DTMF packet.

When there is no loss packet succeeded by a retransmitted packet or by a group of DTMF packets including a retransmitted packet ("No" in operation S21), the loss packet estimator 74 terminates the first loss packet estimation process, and returns to the original process illustrated in FIG. 6.

Figure 14:
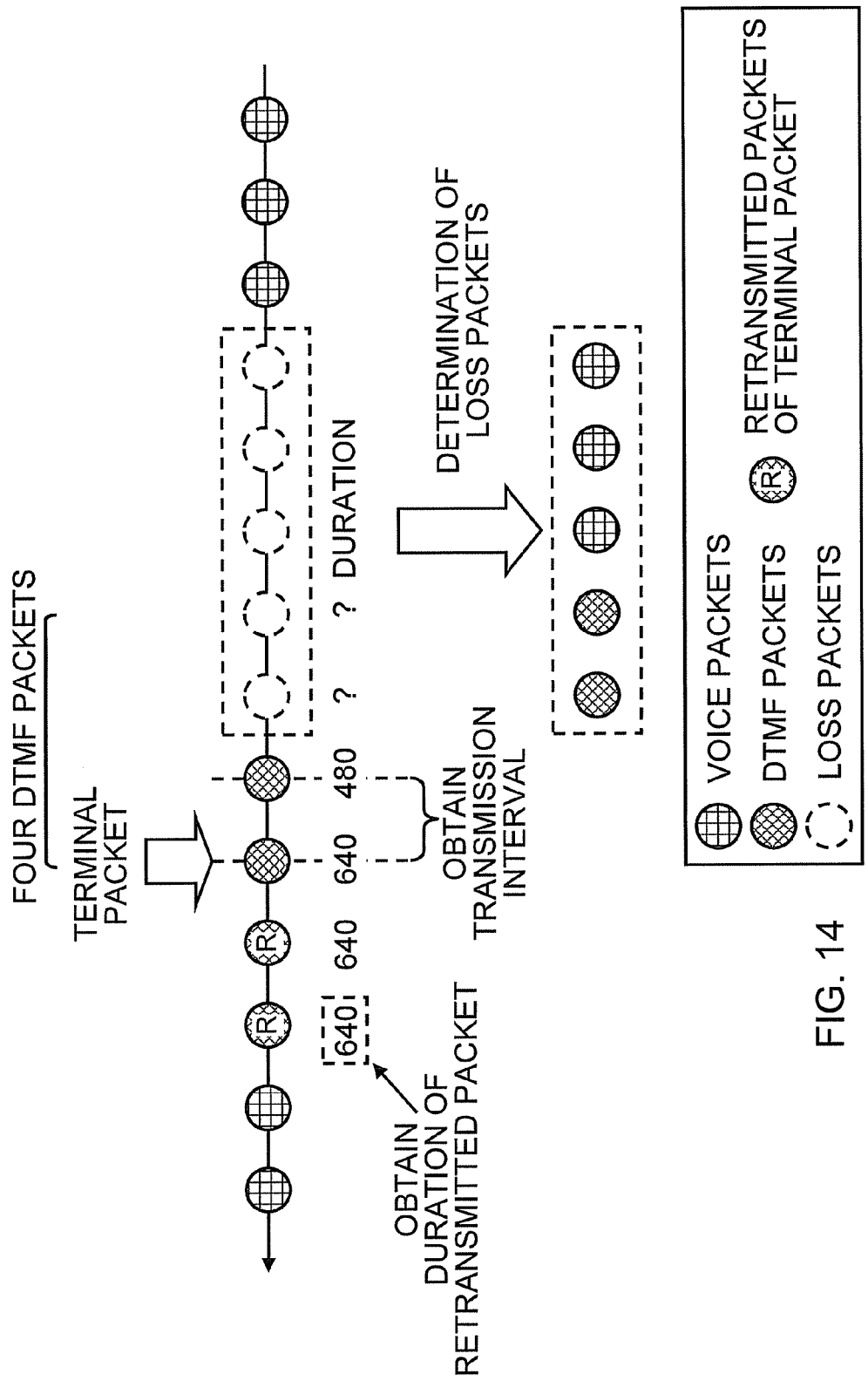
FIG. 14 is a diagram illustrating an example of a loss packet estimation process according to an embodiment of the present invention.

In operation S23, when there are loss packets succeeded by a retransmitted packet or by a group of DTMF packets including a retransmitted packet ("Yes" in operation S21), the loss packet estimator 74 obtains the duration included in the payload of the retransmitted packet. FIG. 14 illustrates an example of the first loss packet estimation process according to the present embodiment. Operation S23 and subsequent operations will be discussed with reference to a specific example illustrated in FIG. 14. FIG. 14 illustrates five loss packets succeeded by four DTMF packets and preceded by a voice packet. Note that in FIG. 14, the sequence numbers are assigned to the DTMF packets in ascending order from right to left. In the example illustrated in FIG. 14, a value "640" is obtained as the duration of the retransmitted packets in operation S23. As mentioned earlier, the duration is represented by a time stamp.

In operation S25, the loss packet estimator 74 obtains a transmission interval of DTMF packets. More specifically, the loss packet estimator 74 obtains a difference, as the transmission interval, between the duration of the DTMF packet succeeding the loss packets and the duration of the next DTMF packet (i.e., the terminal packet in FIG. 14). In the example illustrated in FIG. 14, the duration of the DTMF packet succeeding the loss packets is 480, and the duration of the next DTMF packet is 640. Thus, a difference of 160 is obtained as the transmission interval in operation S25.

DTMF packets that flow in the same RTP session are transmitted at constant time intervals. Accordingly, for example, in a RTP session, a DTMF event that normally flows may be detected, and a difference between the durations of two neighboring DTMF packets in the DTMF event may be obtained as the transmission interval.

In operation S27, the loss packet estimator 74 calculates a total count of packets from the lead packet to the terminal packet in accordance with the duration obtained in operation S23 and the transmission interval obtained in operation S25. More specifically, the loss packet estimator 74 divides the duration by the transmission interval to obtain the total count of packets. In the example illustrated in FIG. 14, the total count of packets is calculated as follows: 640/160=4.

In operation S29, the loss packet estimator 74 determines the type of loss packets in accordance with the total count of packets calculated in operation S27, an amount of DTMF packets succeeding the loss packets, and a retransmission count of the terminal packet to count up the loss count of voice packets and the loss count of DTMF packets. More specifically, the loss packet estimator 74 determines the location of the terminal packet in accordance with the amount of DTMF packets succeeding the loss packets and the retransmission count of the terminal packet. In the example illustrated in FIG. 14, among four DTMF packets succeeding the loss packets, the second packet from the top is determined to be the terminal packet. Thereafter, the loss packet estimator 74 determines the location of the lead packet in accordance with the total count of packets calculated in operation S27. In the example illustrated in FIG. 14, among five loss packets, the fourth packet from the top is determined to be the lead packet. Accordingly, in FIG. 14, it is determined that, among the five loss packets, the last two packets are DTMF packets, and the first three packets are voice packets. The loss count of voice packets and the loss count of DTMF packets are stored in the quality data storage 77. Thereafter, the loss packet estimator 74 terminates the first loss packet estimation process, and returns to the original process illustrated in FIG. 6.

When packet loss occurred at a plurality of locations, the above-discussed process is performed for each of the locations, and the total loss count of packets is stored in the quality data storage 77.

Thus, the type of loss packets may be determined when the first half or the middle of the DTMF event may possibly be lost.

Second Embodiment

A second embodiment of the present invention will be discussed next with reference to FIGS. 15 to 17. The second embodiment discusses a technique for determining the type of loss packets when the last half of the DTMF event may possibly be lost.

The system configuration of the second embodiment is similar to that illustrated in FIG. 3. In addition, the functional configuration of the packet analysis apparatus 7 according to the second embodiment is similar to that illustrated in FIG. 4.

Figure 15:
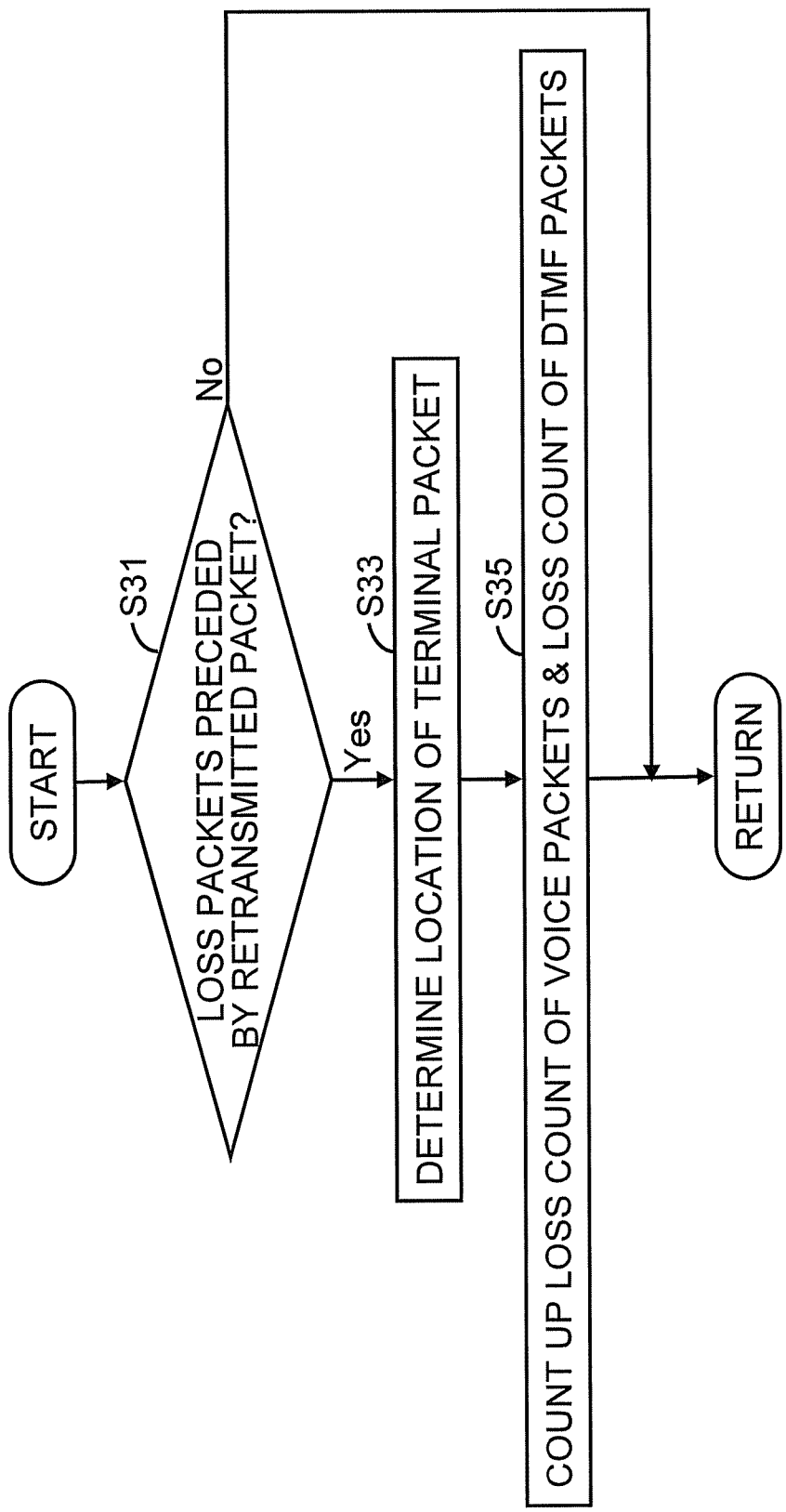
FIG. 15 is a diagram illustrating an example of an operation flow of a loss packet estimation process according to an embodiment of the present invention.

FIG. 15 illustrates an operation flow of a loss packet estimation process according to the second embodiment. The process performed by the packet analysis apparatus 7 is basically similar to that discussed in the first embodiment. However, in place of the first loss packet estimation process performed in operation S9 in FIG. 6, a process (referred to as a second loss packet estimation process) as illustrated in FIG. 15 is performed. The second loss packet estimation process will be discussed below.

In operation S31, the loss packet estimator 74 determines, in accordance with packets stored in the storage unit, whether there are loss packets preceded by a retransmitted packet. That is, it is determined whether a last half of the DTMF event may possibly be lost.

Figure 16:
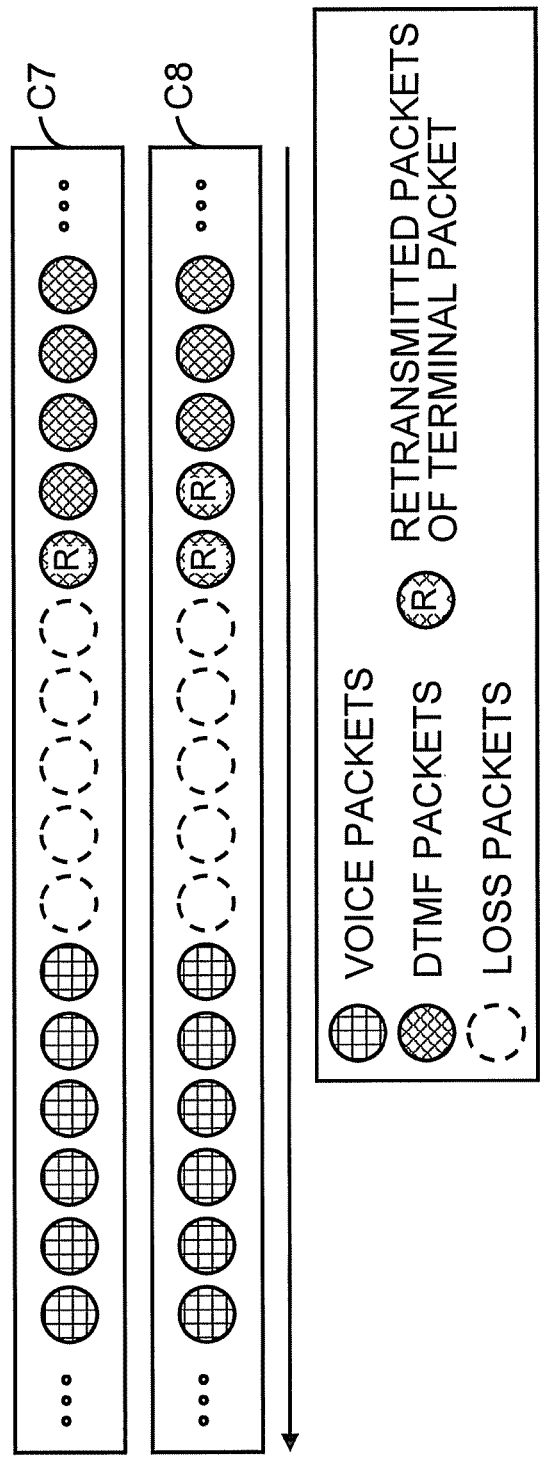
FIG. 16 is a diagram illustrating an example of cases in which loss packets are preceded by a retransmitted packet.
Figure 17:
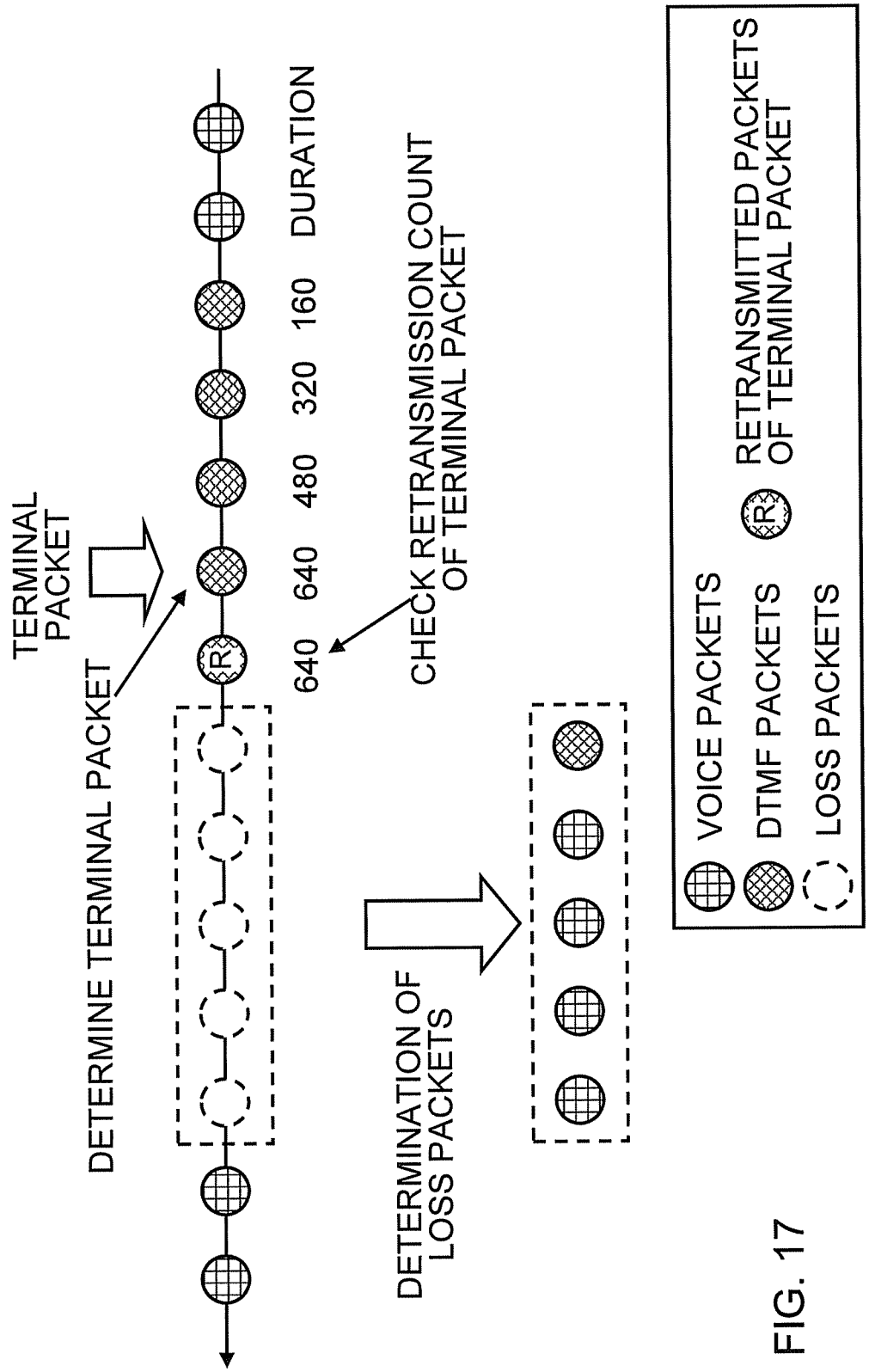
FIG. 17 is a diagram illustrating an example of a loss packet estimation process according to an embodiment of the present invention.

FIG. 16 illustrates cases in which the loss packets are preceded by a retransmitted packet. Note that in each of the cases illustrated in FIG. 16, the sequence numbers are assigned to the DTMF packets in ascending order from right to left. In case C7, the loss packets are succeeded by a voice packet and preceded by one retransmitted packet. In case C8, the loss packets are succeeded by a voice packet and preceded by two retransmitted packets.

When there is no loss packet preceded by a retransmitted packet ("No" in operation S31), the loss packet estimator 74 terminates the second loss packet estimation process, and returns to the original process illustrated in FIG. 6.

In operation S33, when there are loss packets preceded by a retransmitted packet ("Yes" in operation S31), the loss packet estimator 74 obtains the duration included in the retransmitted packet to determine the location of the terminal packet in accordance with the duration. Operation S33 and the subsequent operation will be discussed with reference to a specific example illustrated in FIG. 17. FIG. 17 illustrates an example of the second loss packet estimation process according to the present embodiment, in which five loss packets are succeeded by a voice packet and preceded by one retransmitted packet. Note that in FIG. 17, the sequence numbers are assigned to the DTMF packets in ascending order from right to left. As mentioned earlier, the duration of the retransmitted packet is set to a value that is identical with that of the terminal packet. Accordingly, among DTMF packets having a duration that is identical with that of the retransmitted packet, the loss packet estimator 74 determines a DTMF packet having the minimum sequence number as the terminal packet. In FIG.

17, among the five DTMF packets preceding the loss packets, the fourth packet from the top is determined to be the terminal packet.

In operation S35, the loss packet estimator 74 determines the type of loss packets in accordance with the location of the terminal packet and the retransmission count of the terminal packet and counts up a loss count of voice packets and a loss count of DTMF packets. In the example illustrated in FIG. 17, there is only one retransmitted packet, although two retransmitted packets are supposed to. Accordingly, it may be determined that one retransmitted packet has been lost. That is, in FIG. 17, it is determined that, among the five loss packets, the first packet is a DTMF packet and the other four packets are voice packets. The loss count of voice packets and the loss count of DTMF packets are stored in the quality data storage 77. Thereafter, the loss packet estimator 74 terminates the second loss packet estimation process, and returns to the original process illustrated in FIG. 6.

Thus, the type of loss packets may be determined when the last half of the DTMF event may possibly be lost.

Third Embodiment

A third embodiment of the present invention will be discussed next with reference to FIGS. 18 to 21. The third embodiment discusses a technique for determining the type of some of the loss packets when the retransmitted packets have been lost.

Figure 18:
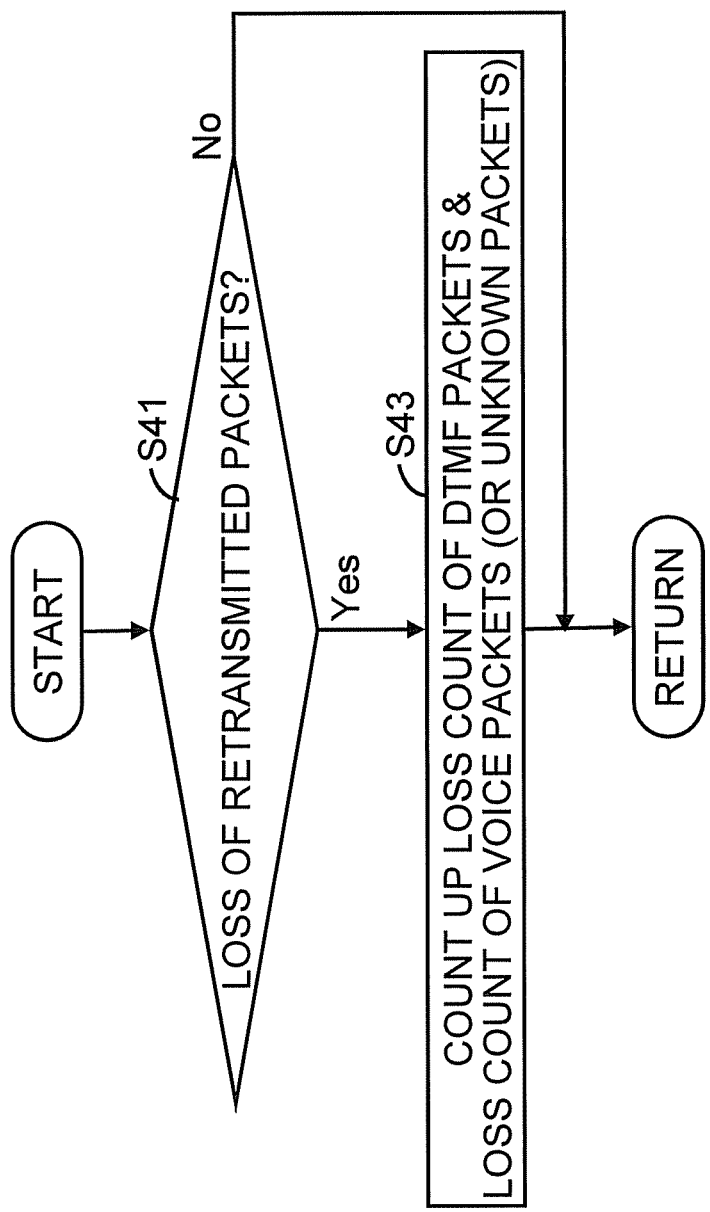
FIG. 18 is a diagram illustrating an example of an operation flow of a loss packet estimation process according to an embodiment of the present invention.

The system configuration of the third embodiment is similar to that illustrated in FIG. 3. In addition, the functional configuration of a packet analysis apparatus 7 according to the third embodiment is similar to that illustrated in FIG. 4. FIG. 18 illustrates an operation flow of a loss packet estimation process according to the third embodiment. The process performed by the packet analysis apparatus 7 is basically similar to that discussed in the first embodiment. However, in place of the first loss packet estimation process performed in operation S9 illustrated in FIG. 6, a process (referred to as a third loss packet estimation process) as illustrated in FIG. 18 is performed. The third loss packet estimation process will be discussed below.

In operation S41, the loss packet estimator 74 determines whether the retransmitted packets have been lost in accordance with the packets stored in the storage unit. More specifically, the loss packet estimator 74 determines whether there are loss packets succeeded by a voice packet and preceded by a DTMF packet other than a retransmitted packet.

FIG. 19 illustrates a case in which retransmitted packets have been lost. Note that in case C9 illustrated in FIG. 19, the sequence numbers are assigned to the DTMF packets in ascending order from right to left. In case C9, the loss packets are succeeded by a voice packet and preceded by a DTMF packet other than a retransmitted packet.

When the retransmitted packets have not been lost ("No" in operation S41), the loss packet estimator 74 terminates the third loss packet estimation process, and returns to the original process illustrated in FIG. 6.

Figure 21:
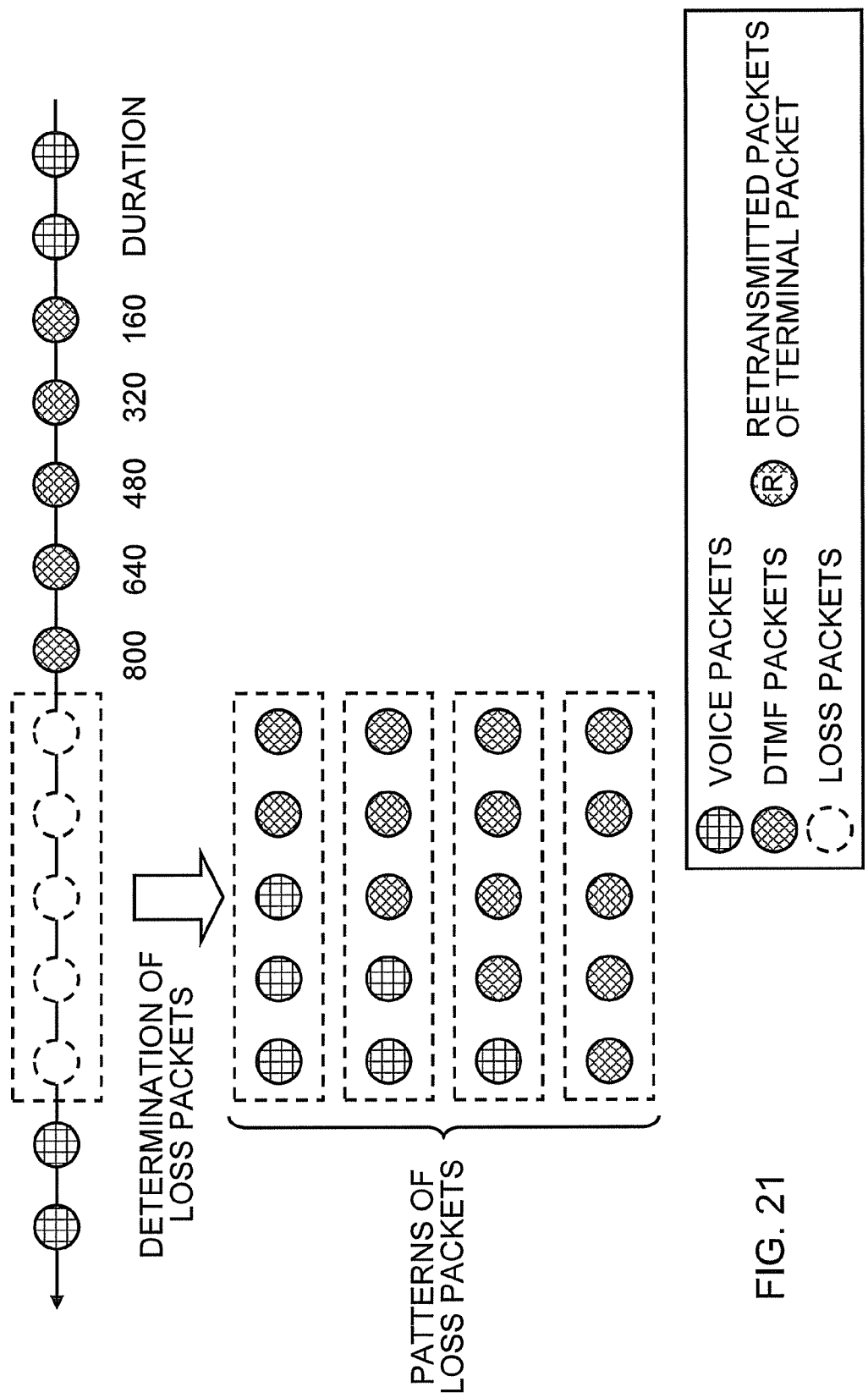
FIG. 21 is a diagram illustrating an example of a loss packet estimation process according to an embodiment of the present invention.

In operation S43, when the retransmitted packets have been lost ("Yes" in operation S41), the loss packet estimator 74 counts up the loss count of DTMF packets by the retransmission count of the terminal packet and counts up the loss count of voice packets (or unknown packets) by a difference between the loss count of packets and the loss count of DTMF packets thereof. Note that since the retransmitted packets have been lost, at least DTMF packets of the retransmission count have been lost. That is, in operation S43, the loss packet estimator 74 counts up the loss count of DTMF packets by the retransmission count of the terminal packet and counts up the loss count of voice packets (or unknown packets) by the amount of other loss packets. FIGS. 20 and 21 illustrate an example of the third loss packet estimation process according to the present embodiment, in which five loss packets include the retransmitted packets. When packets have been lost as in case C9 illustrated in FIG. 19, the loss count of DTMF packets is 2, and the loss count of voice packets (or unknown packets) is 3, as illustrated in FIG. 20. The loss count of voice packets, the loss count of DTMF packets, and the loss count of unknown packets are stored in the quality data storage 77. Thereafter, the loss packet estimator 74 terminates the third loss packet estimation process, and returns to the original process illustrated in FIG. 6.

When packets have been lost as in case C9 illustrated in FIG. 19, the loss packets may be in one of four patterns illustrated in FIG. 21. In this case, the maximum loss count of voice packets is 3 and the minimum loss count of voice packets is 0. Accordingly, the loss count of voice packets may be counted in a range. In such a case, the transmission quality in the case of the maximum loss count and the transmission quality in the case of the minimum loss count may be calculated and output.

Thus, the type of at least some of the loss packets may be determined when the retransmitted packets have been lost, and the range of the loss rate of voice packets may be determined.

Fourth Embodiment

Figure 22:
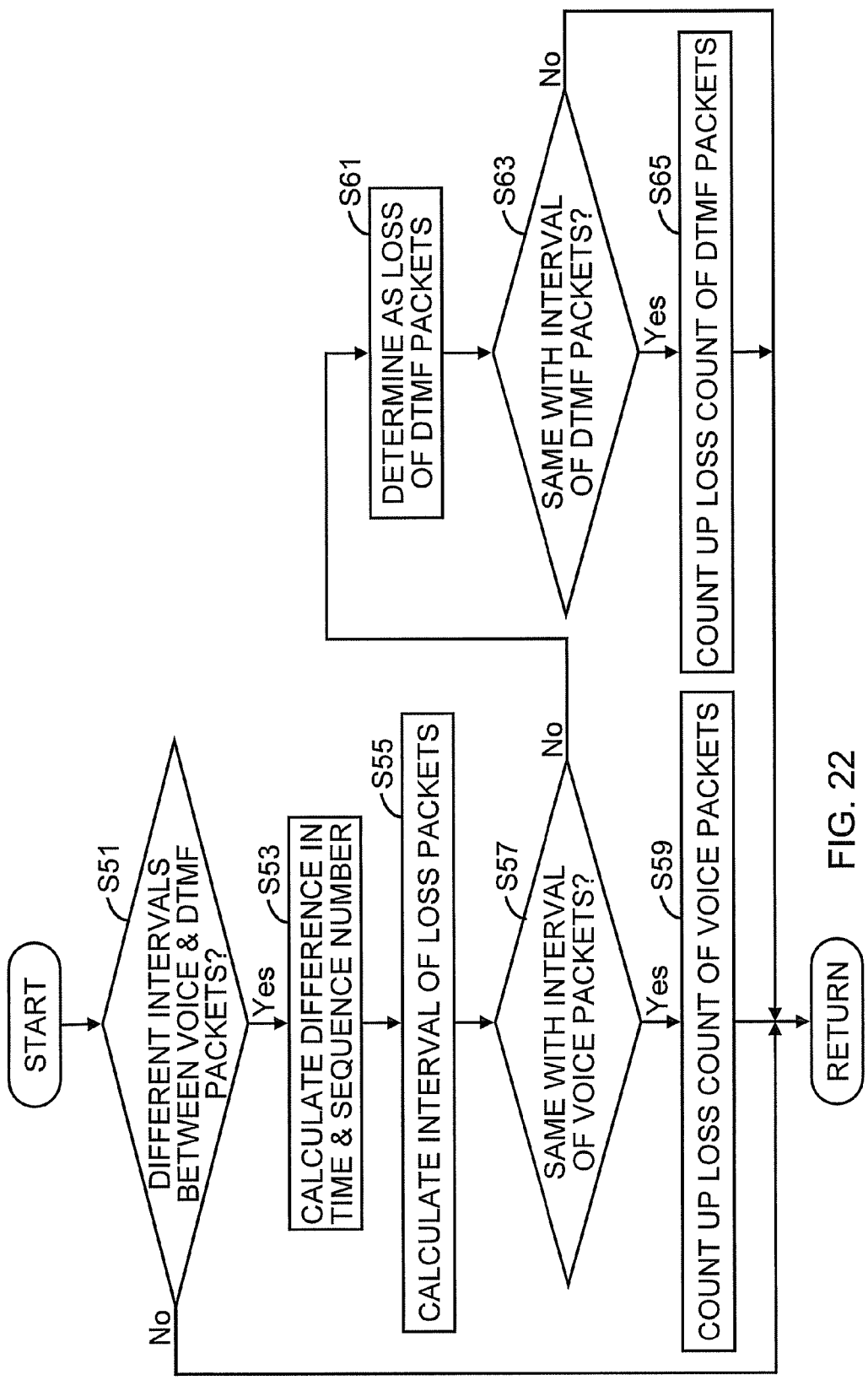
FIG. 22 is a diagram illustrating an example of an operation flow of a loss packet estimation process according to an embodiment of the present invention.

A fourth embodiment according to the present invention will be discussed next with reference to FIGS. 22 to 24. The fourth embodiment discusses a technique for determining the type of loss packets when the transmission interval of voice packets differs from that of DTMF packets. Assume, in the present embodiment, that the transmission interval of voice packets is 20 ms, and that the transmission interval of DTMF packets is 40 ms.

The system configuration of the fourth embodiment is similar to that illustrated in FIG. 3. In addition, the functional configuration of a packet analysis apparatus 7 according to the fourth embodiment is similar to that illustrated in FIG. 4. FIG. 22 illustrates an operation flow of a loss packet estimation process according to the fourth embodiment. The process performed by the packet analysis apparatus 7 is basically similar to that discussed in the first embodiment. However, in place of the first loss packet estimation process performed in operation S9 illustrated in FIG. 6, a process (referred to as a fourth loss packet estimation process) as illustrated in FIG. 22 is performed. The fourth loss packet estimation process will be discussed below.

In operation S51, the loss packet estimator 74 determines whether the transmission interval of voice packets differs from the transmission interval of DTMF packets. The transmission interval of voice packets and the transmission interval of DTMF packets may be calculated in accordance with, for example, captured packets. When the transmission interval of voice packets is identical with that of DTMF packets ("No" in operation S51), the loss packet estimator 74 terminates the fourth loss packet estimation process, and returns to the original process illustrated in FIG. 6.

In operation S53, when the transmission interval of voice packets differs from the transmission interval of DTMF packets ("Yes" in operation S51), the loss packet estimator 74 calculates a difference in time and the sequence number between the previous and next packets to the loss packets. The "previous and next packets" refers to a packet having a sequence number that indicates the location preceding the loss packets and a packet having a sequence number that indicates the location succeeding the loss packets, respectively. The difference in time between the previous and next packets to the loss packets may be obtained by calculating a difference between the time stamps included in the header of the previous and next packets and converting the difference into an actual period of time.

In operation S55, the loss packet estimator 74 calculates the transmission interval of loss packets in accordance with the difference in time and the sequence number calculated in operation S53. More specifically, the loss packet estimator 74 divides the difference in time by the difference in the sequence number to calculate the transmission interval of loss packets.

Figure 23:
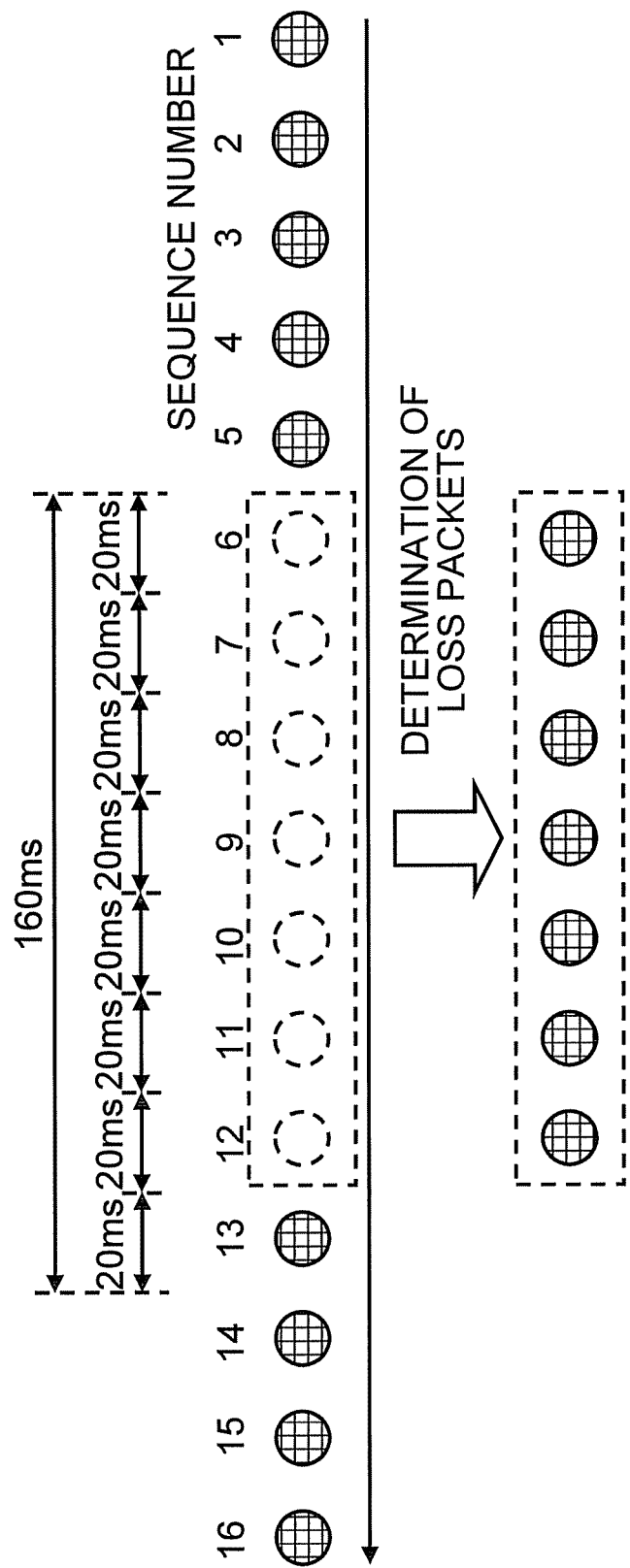
FIG. 23 is a diagram illustrating an example of a loss packet estimation process according to an embodiment of the present invention.

FIG. 23 illustrates an example of the fourth loss packet estimation process according to the present embodiment, in which seven voice packets, for example, have been lost. In the example illustrated in FIG. 23, the difference in time between the previous and next packets to the loss packets is 160 ms, and the difference in the sequence number is 8 (=13−5). Accordingly, the transmission interval of loss packets is calculated as follows: 160 ms/8=20 ms.

In operation S57, the loss packet estimator 74 determines whether the transmission interval of loss packets is identical with that of voice packets.

In operation S59, when the transmission interval of loss packets is identical with that of voice packets ("Yes" in operation S57), the loss packet estimator 74 determines that all of the loss packets are voice packets. Thus, the loss packet estimator 74 counts up the loss count of voice packets by the loss count of packets. In the example illustrated in FIG. 23, it is determined that the transmission interval of loss packets (20 ms) is identical with that of voice packets (20 ms). Thus, the loss packet estimator 74 counts up the loss count of voice packets by the loss count of packets (7). The loss count of voice packets is stored in the quality data storage 77. Thereafter, the loss packet estimator 74 terminates the fourth loss packet estimation process, and returns to the original process illustrated in FIG. 6.

In operation S61, when the transmission interval of loss packets differs from that of voice packets ("No" in operation S57), the loss packet estimator 74 determines that DTMF packets have been lost.

Figure 24:
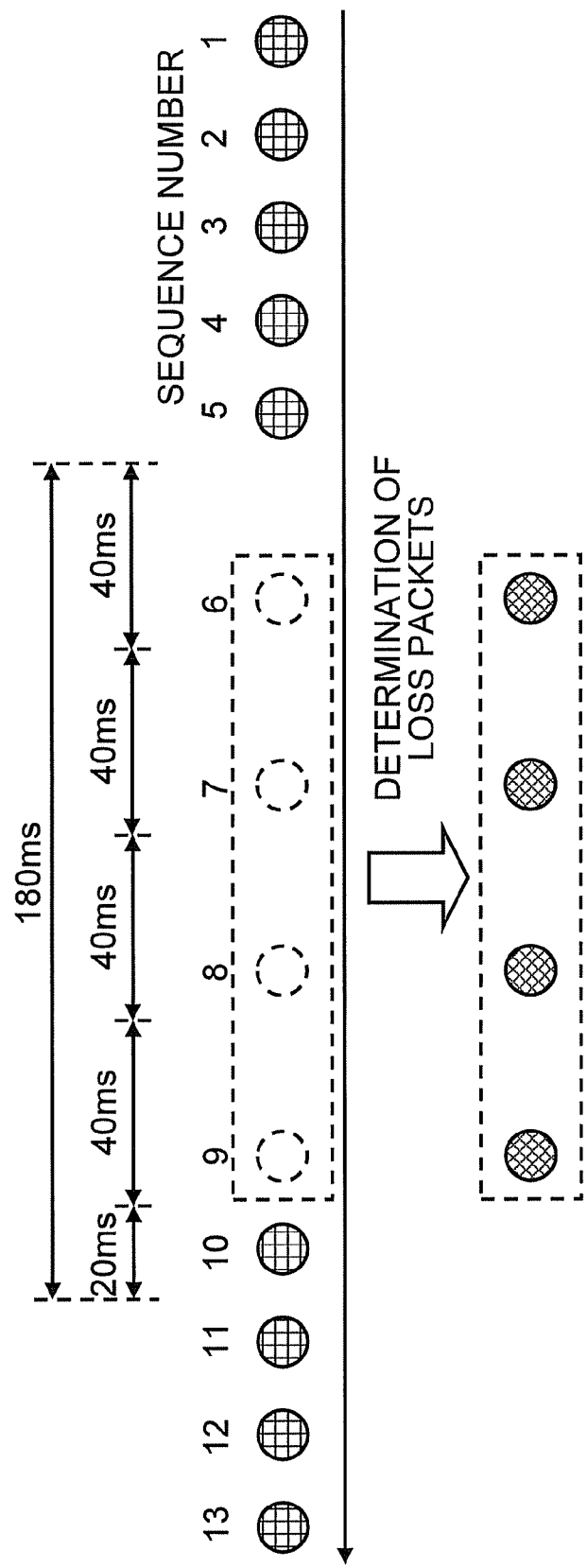
FIG. 24 is a diagram illustrating an example of a loss packet estimation process according to an embodiment of the present invention.

FIG. 24 illustrates an example of the fourth loss packet estimation process according to the present embodiment, in which four DTMF packets, for example, have been lost. In the example illustrated in FIG. 24, the difference in time between the previous and next packets to the loss packets is 180 ms, and the difference in the sequence number is 5 (=10−5). In this case, the transmission interval of loss packets is calculated, in operation S55, as follows: (180 ms−20 ms)/(5−1)=40 ms. That is, it is determined, in operation S57, that the transmission interval of loss packets (40 ms) differs from that of voice packets (20 ms) and, therefore, it is determined, in operation S61, that DTMF packets have been lost.

In operation S63, the loss packet estimator 74 determines whether the transmission interval of loss packets is identical with that of DTMF packets.

In operation S65, when the transmission interval of loss packets is identical with that of DTMF packets ("Yes" in operation S63), the loss packet estimator 74 determines that all of the loss packets are DTMF packets, that is, the loss packet estimator 74 determines that no voice packets have been lost. Thus, the loss packet estimator 74 counts up the loss count of DTMF packets by the loss count of packets. The loss count of voice packets (=0) calculated in accordance with the loss count of DTMF packets is stored in the quality data storage 77. Alternatively, the loss count of voice packets may not be stored in the quality data storage 77 since the loss count of voice packets is 0. Thereafter, the loss packet estimator 74 terminates the fourth loss packet estimation process, and returns to the original process illustrated in FIG. 6.

When the transmission interval of loss packets differs from that of DTMF packets ("No" in operation S63), operation S65 is skipped. Thereafter, the loss packet estimator 74 terminates the fourth loss packet estimation process, and returns to the original process illustrated in FIG. 6.

Thus, the type of loss packets may be determined when the transmission interval of voice packets differs from that of DTMF packets.

Fifth Embodiment

Figure 25:
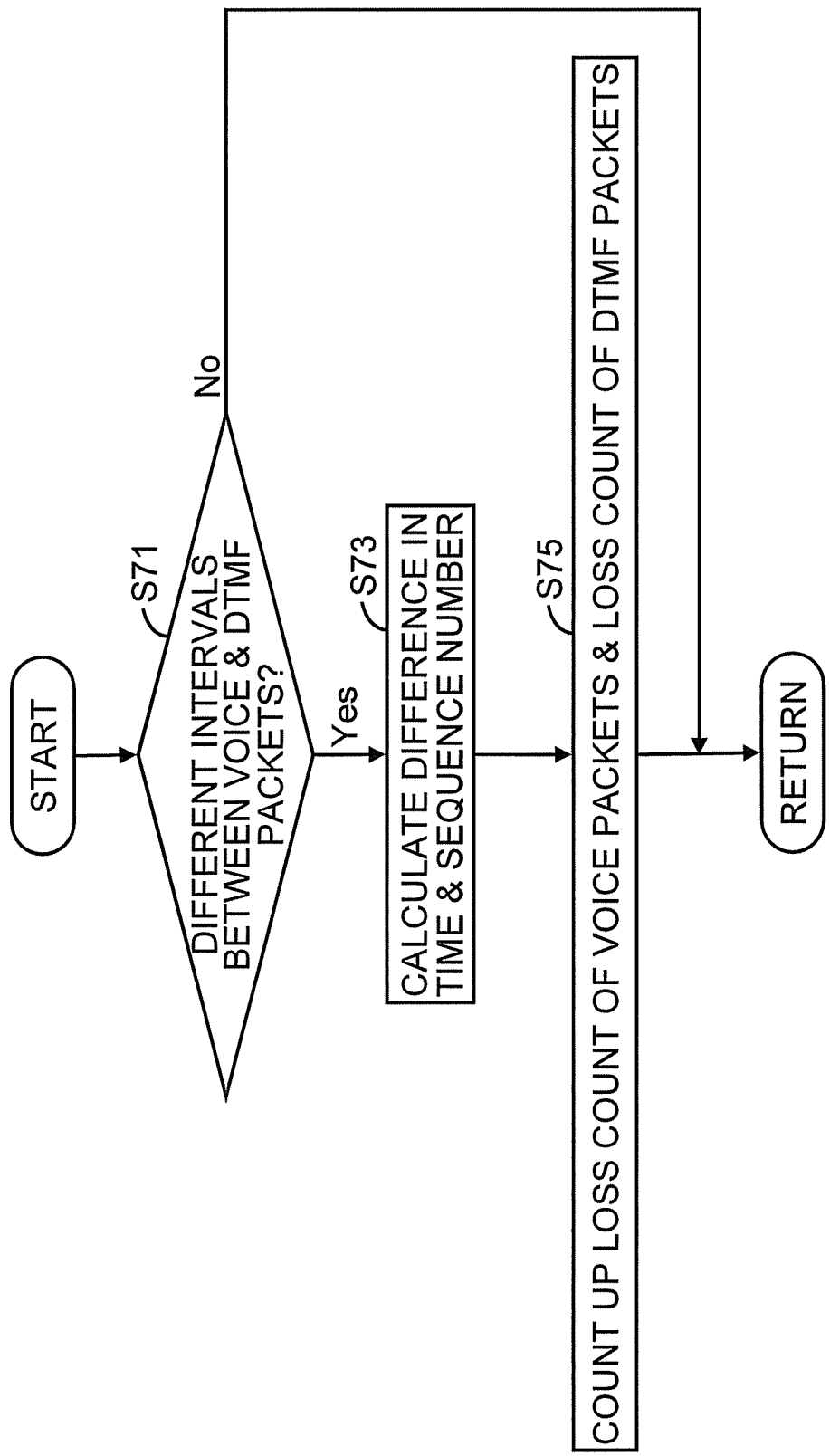
FIG. 25 is a diagram illustrating an example of an operation flow of a loss packet estimation process according to an embodiment of the present invention.

A fifth embodiment according to the present invention will be discussed next with reference to FIGS. 25 and 26. The fifth embodiment discusses a technique for calculating the loss count of voice packets and the loss count of DTMF packets when the transmission interval of voice packets differs from that of DTMF packets. Assume, in the present embodiment, that the transmission interval of voice packets is 20 ms, and that the transmission interval of DTMF packets is 40 ms.

The system configuration of the fifth embodiment is similar to that illustrated in FIG. 3. In addition, the functional configuration of a packet analysis apparatus 7 according to the fifth embodiment is similar to that illustrated in FIG. 4. FIG. 25 illustrates an operation flow of a loss packet estimation process according to the fifth embodiment. The process performed by the packet analysis apparatus 7 is basically similar to that discussed in the first embodiment. However, in place of the first loss packet estimation process performed in operation S9 illustrated in FIG. 6, a process (referred to as a fifth loss packet estimation process) as illustrated in FIG. 25 is performed. The fifth loss packet estimation process will be discussed below.

In operation S71, the loss packet estimator 74 determines whether the transmission interval of voice packets differs from the transmission interval of DTMF packets. When the transmission interval of voice packets is identical with that of DTMF packets ("No" in operation S71), the loss packet estimator 74 terminates the fifth loss packet estimation process, and returns to the original process illustrated in FIG. 6.

In operation S73, when the transmission interval of voice packets differs from the transmission interval of DTMF packets ("Yes" in operation S71), the loss packet estimator 74 calculates a difference in time and the sequence number between the previous and next packets to the loss packets. Operation S73 and the subsequent operation will be discussed with reference to an example illustrated in FIG. 26. FIG. 26 illustrates an example of the fifth loss packet estimation process according to the present embodiment, in which six packets (two voice packets and four DTMF packets) have been lost. In the example illustrated in FIG. 26, the difference in time between the previous and next packets to the loss packets is 220 ms, and the difference in the sequence number is 7 (=10−3).

In operation S75, the loss packet estimator 74 calculates the loss count of voice packets and the loss count of DTMF packets in accordance with the transmission interval of voice packets, the transmission interval of DTMF packets, and the difference in time and the sequence number between the previous and next packets to the loss packets calculated in operation S73. More specifically, the loss packet estimator 74 performs the following calculation in accordance with the loss packets and the next packet to the loss packets. Let x denote a variable indicating an amount of voice packets among the packets, and let y denote a variable indicating an amount of DTMF packets. Then, the values of x and y may be obtained by solving the following simultaneous equations:

$$20x+40y=220 \quad (1)$$

$$x+y=7 \quad (2)$$

Figure 26:
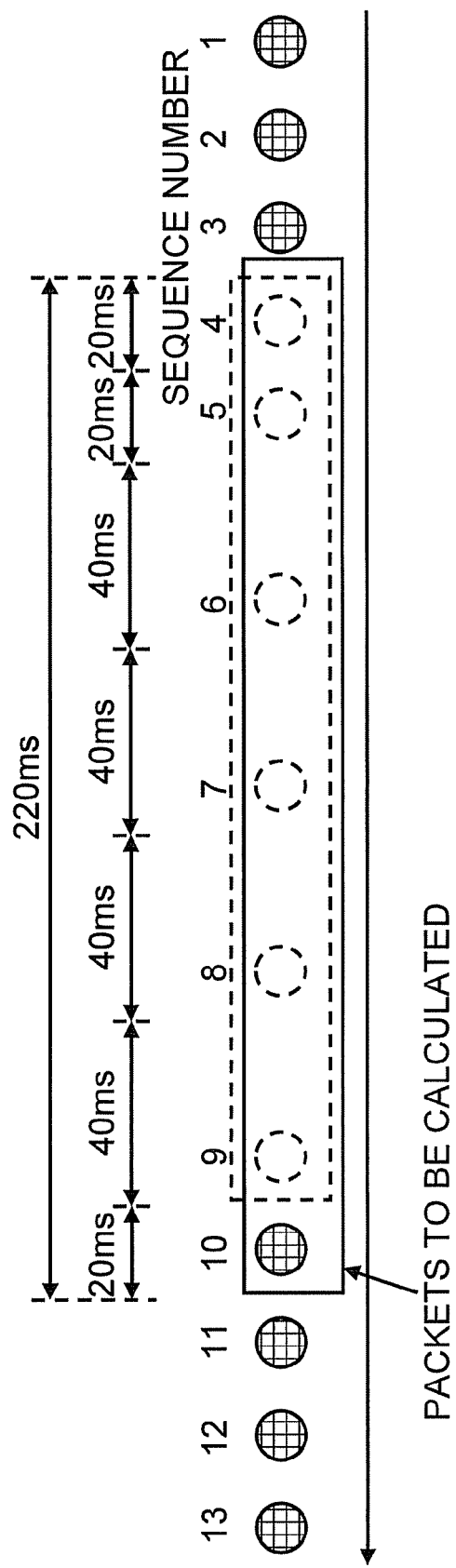
FIG. 26 is a diagram illustrating an example of a loss packet estimation process according to an embodiment of the present invention.

Note that such calculation is performed on seven packets having sequence numbers of 4 to 10 illustrated in FIG. 26.

Note that in equation (1), "20" represents the transmission interval of voice packets, and "40" represents the transmission interval of DTMF packets. Furthermore, in equation (1), "220" represents the difference in time between the previous and next packets to the loss packets calculated in operation S73. In equation (2), "7" represents the difference in the sequence number between the previous and next packets to the loss packets calculated in operation S73. By solving the simultaneous equations, the loss packet estimator 74 may obtain a solution: x=3 and y=4. Since the voice packet succeeding the loss packets is included in the calculation, the loss count of voice packets is the value of x minus one. Accordingly, the loss packets include 2 (=3−1) voice packets and 4 DTMF packets. The loss count of voice packets and the loss count of DTMF packets are stored in the quality data storage 77. Thereafter, the loss packet estimator 74 terminates the fifth loss packet estimation process, and returns to the original process illustrated in FIG. 6.

Thus, the loss count of voice packets and the loss count of DTMF packets may be determined when the transmission interval of voice packets differs from that of DTMF packets.

Sixth Embodiment

A sixth embodiment according to the present invention will be discussed next with reference to FIGS. 27 to 30. Note that the first to fifth embodiments discuss techniques for determining the type of loss packets using the above-discussed characteristics of DTMF packets. However, according to the sixth embodiment, the type of loss packets is determined in accordance with the type of previous and next packets to the loss packets.

Figure 27:
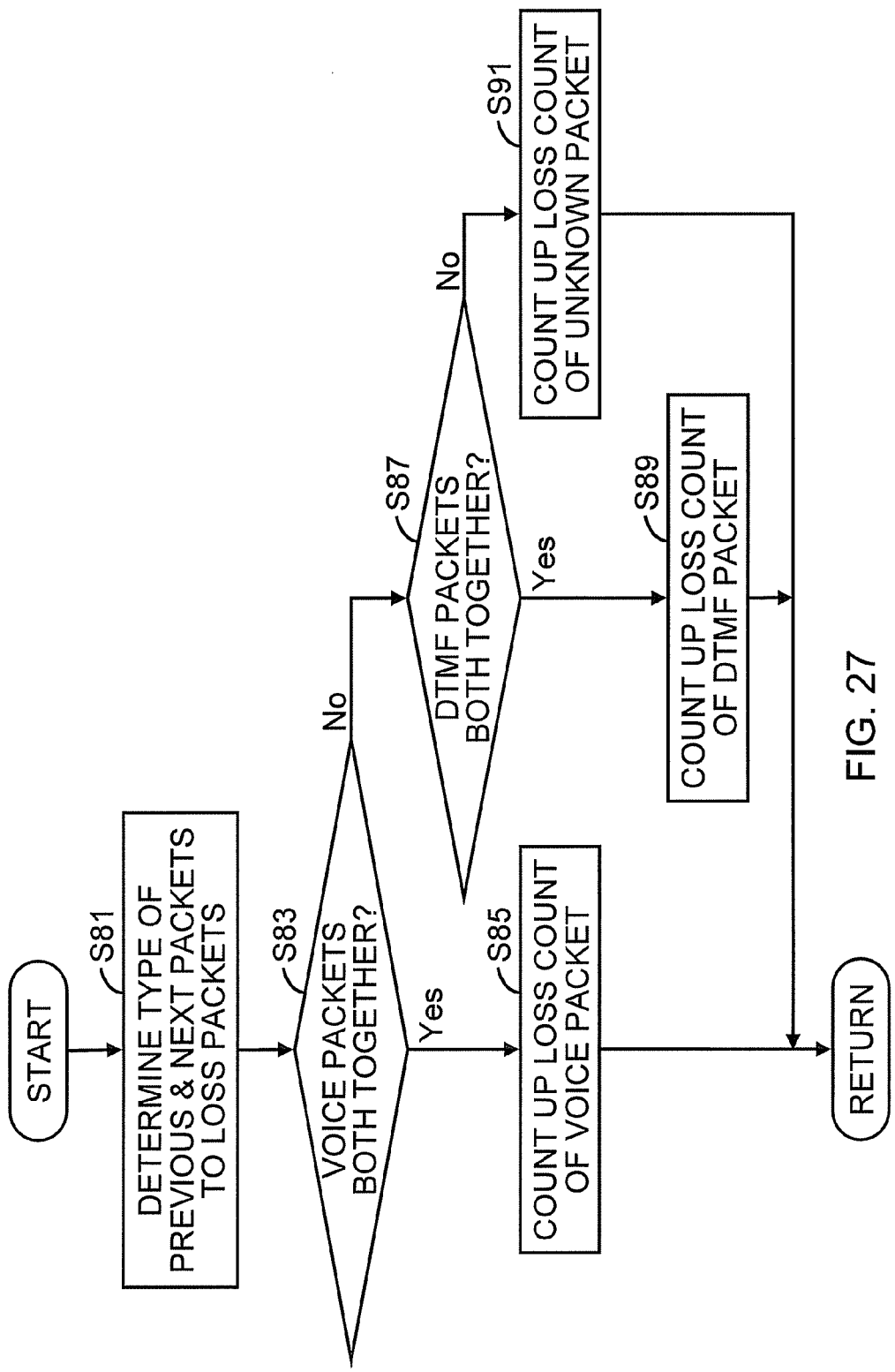
FIG. 27 is a diagram illustrating an example of an operation flow of a loss packet estimation process according to an embodiment of the present invention.

The system configuration of the sixth embodiment is similar to that illustrated in FIG. 3. In addition, the functional configuration of a packet analysis apparatus 7 according to the sixth embodiment is similar to that illustrated in FIG. 4. FIG. 27 illustrates an operation flow of a loss packet estimation process according to the sixth embodiment. The process performed by the packet analysis apparatus 7 is basically similar to that discussed in the first embodiment. However, in place of the first loss packet estimation process performed in operation S9 illustrated in FIG. 6, a process (referred to as a sixth loss packet estimation process) as illustrated in FIG. 27 is performed. The sixth loss packet estimation process will be discussed below.

In operation S81, the loss packet estimator 74 determines the type of previous and next packets to the loss packets in accordance with the packets stored in the storage unit.

In operation S83, the loss packet estimator 74 determines whether both the previous and next packets to the loss packets are voice packets.

In operation S85, when both the previous and next packets to the loss packets are voice packets ("Yes" in operation S83), the loss packet estimator 74 determines that all of the loss packets are voice packets. FIG. 28 illustrates an example of the sixth loss packet estimation process according to the present embodiment, in which both the previous and next packets to the loss packets are voice packets. In the present embodiment, the loss packet estimator 74 determines that three loss packets illustrated in FIG. 28 are all voice packets.

The loss packet estimator 74 counts up the loss count of voice packets by the amount of the loss packets. The loss count of voice packets is stored in the quality data storage 77.

Thereafter, the loss packet estimator 74 terminates the sixth loss packet estimation process, and returns to the original process illustrated in FIG. 6.

In operation S87, when at least one of the previous and next packets to the loss packets is a DTMF packet ("No" in operation S83), the loss packet estimator 74 determines whether both the previous and next packets to the loss packets are DTMF packets.

In operation S89, when both the previous and next packets to the loss packets are DTMF packets ("Yes" in operation S87), the loss packet estimator 74 determines that all of the loss packets are DTMF packets. FIG. 29 illustrates an example of the sixth loss packet estimation process according to the present embodiment, in which both the previous and next packets to the loss packets are DTMF packets. In the present embodiment, the loss packet estimator 74 determines that three loss packets illustrated in FIG. 29 are all DTMF packets.

The loss packet estimator 74 counts up the loss count of DTMF packets by the amount of the loss packets. The loss count of voice packets (=0) calculated in accordance with the loss count of DTMF packets is stored in the quality data storage 77. Alternatively, the loss count of voice packets may not be stored in the quality data storage 77 since the loss count of voice packets is 0. Thereafter, the loss packet estimator 74 terminates the sixth loss packet estimation process, and returns to the original process illustrated in FIG. 6.

In operation S91, when the type of previous and next packets to the loss packets differs from each other ("No" in operation S87), the loss packet estimator 74 counts up the loss count of unknown packets. FIG. 30 illustrates an example of the sixth loss packet estimation process according to the present embodiment, in which one of the previous and next packets to the loss packets is a voice packet and the other is a DTMF packet. In the present embodiment, the loss packet estimator 74 determines that three loss packets illustrated in FIG. 30 are all unknown packets. The loss count of voice packets (=0) calculated in accordance with the loss count of unknown packets is stored in the quality data storage 77. Alternatively, the loss count of voice packets may not be stored in the quality data storage 77 since the loss count of voice packets is 0. Thereafter, the loss packet estimator 74 terminates the sixth loss packet estimation process, and returns to the original process illustrated in FIG. 6.

Thus, the type of loss packets may be determined in accordance with the type of previous and next packets to the loss packets.

When the type of previous and next packets to the loss packets differs from each other, the process discussed in the first to fifth embodiments may be employed in place of operation S91.

While embodiments of the present invention have been discussed above, embodiments of the present invention are not limited thereto. For example, any of the above-discussed embodiments may be combined.

It should be noted that the above-discussed functional configuration of the packet analysis apparatus 7 does not necessarily correspond to an actual program configuration.

The data stored in the quality data storage 77 illustrated in FIG. 5 are only examples, and the data configurations are not limited to the above-discussed configuration. In the above-discussed operation flows, the operations may be executed in different order or in parallel if the results are the same.

Figure 34:
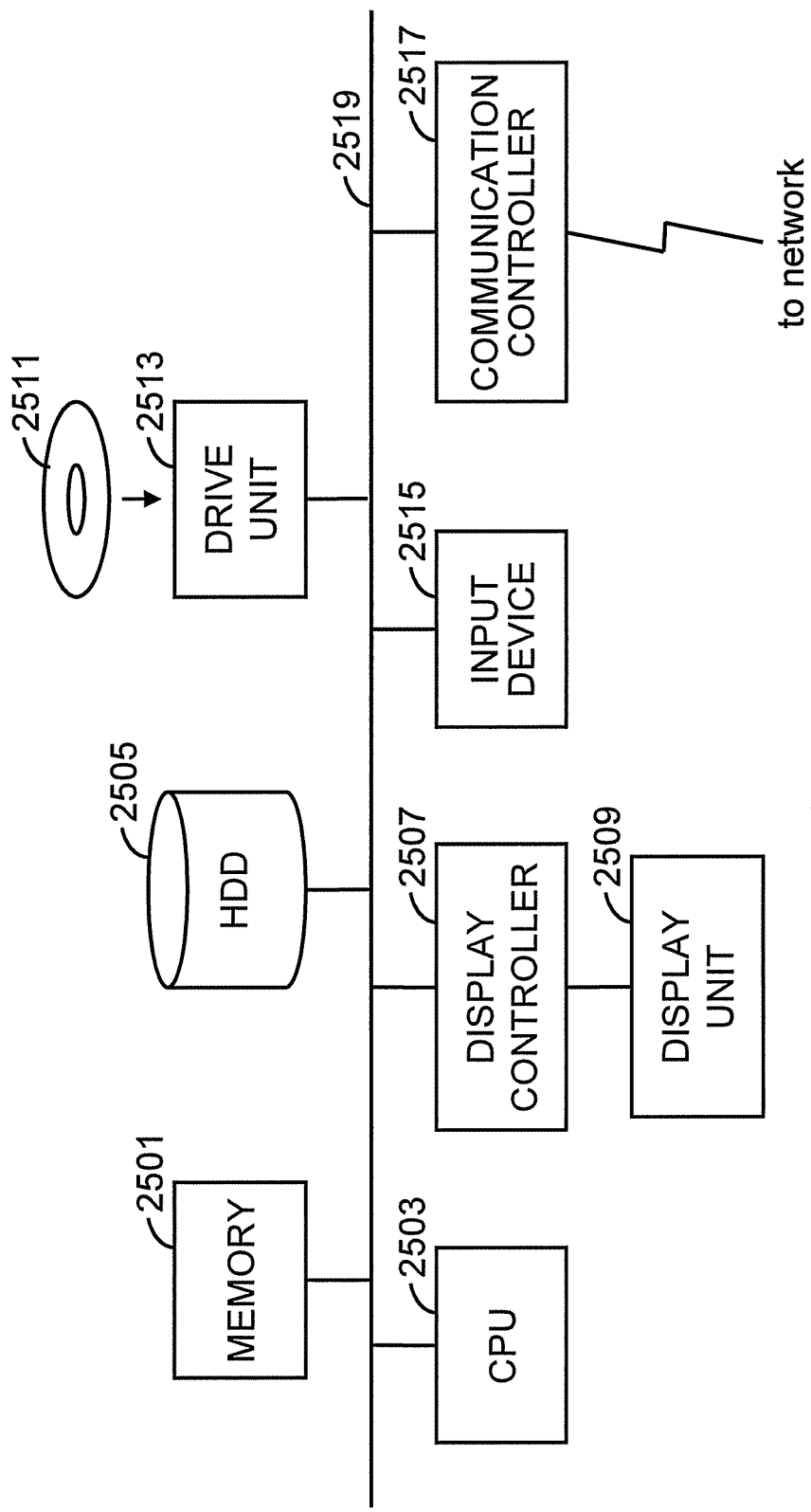
FIG. 34 is a diagram illustrating an example of a system configuration of a computer.

The packet analysis apparatus 7 discussed above may be a computer. FIG. 34 illustrates an example of a system configuration of a computer. In FIG. 34, a memory 2501, a central processing unit (CPU) 2503, a hard disk drive (HDD) 2505, a display controller 2507 connected to a display unit 2509, a drive unit 2513 for a computer-readable removable disk 2511, an input device 2515, and a communication controller 2517 for connecting the packet analysis apparatus 7 to a network are connected to one another via a bus 2519. An operating system (OS) and application programs for executing the processes according to the embodiments are stored in the HDD 2505. When the programs are executed by the CPU 2503, the programs are loaded from the HDD 2505 into the memory 2501. In order to perform necessary operations, the CPU 2503 controls the display controller 2507, the communication controller 2517, and the drive unit 2513 as needed. In addition, data being processed is stored in the memory 2501 and is stored in the HDD 2505 as needed. According to the embodiments of the present invention, the application programs that realize the above-discussed process are recorded in the computer-readable removable disk 2511 and are distributed. The computer-readable removable disk 2511 includes a flexible disk, a compact disk read only memory (CD-ROM), and a magneto-optical disk. A semiconductor memory or a hard disk may also be employed. Thus, the application programs are installed in the HDD 2505 via the drive unit 2513. However, the application programs may be installed in the HDD 2505 through a network, such as the Internet, via the communication controller 2517. In the computer, the above-discussed hardware (e.g., the CPU 2503 and the memory 2501), the OS, and the application programs closely cooperate so that the above-discussed various functions are realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described, in detail, it should be understood that the various changes, substitutions, and alterations could be made hereto without departing from the spirit and scope of the invention.

What is claimed is:

1. A method executed by a packet analysis apparatus for analyzing packets including voice packets and non-voice packets, the method comprising:
    capturing packets in a specific session;
    storing the captured packets in a storage;
    screening the stored packets to count up a receipt count of voice packets in accordance with predefined characteristics of non-voice packets, wherein the non-voice packets are dual tone multiple frequency (DTMF) packets of a DTMF event, and the predefined characteristics of non-voice packets include at least one of a retransmission count of the DTMF event, a duration of each DTMF packet, and a transmission interval of the DTMF packets, the retransmission count representing how many times a terminal packet has been retransmitted, the terminal packet being a DTMF packet transmitted as a last packet of the DTMF event, the duration being represented by a time stamp since a start time of the DTMF event, the transmission interval being an interval of transmissions of packets;
    determining whether packet loss has occurred in the specific session;
    determining, by the packet analysis apparatus, by substantially eliminating an influence of the non-voice packets, whether loss packets are voice packets in accordance with received packets adjacent to the loss packets to count up a loss count of voice packets when the packet loss has occurred,
    determining whether the loss packets are succeeded by a retransmitted packet of the terminal packet or by DTMF packets including the retransmitted packet of the terminal packet;
    calculating a total count of packets from a lead packet to the terminal packet of the DTMF event including the retransmitted packet by dividing a duration included in the retransmitted packet by a transmission interval of the DTMF packets when the loss packets are succeeded by the retransmitted packet of the terminal packet or by DTMF packets including the retransmitted packet of the terminal packet; and
    determining whether the loss packets are voice packets or DTMF packets in accordance with
        an amount of DTMF packets succeeding the loss packets,
        the retransmission count of the terminal packet, and
        the total count of packets from the lead packet to the terminal packet of the DTMF event.

2. A method executed by a packet analysis apparatus for analyzing packets including voice packets and non-voice packets, the method comprising:
    capturing packets in a specific session;
    storing the captured packets in a storage;
    screening the stored packets to count up a receipt count of voice packets in accordance with predefined characteristics of non-voice packets, wherein the non-voice packets are dual tone multiple frequency (DTMF) packets of a DTMF event, and the predefined characteristics of non-voice packets include at least one of a retransmission count of the DTMF event, a duration of each DTMF packet, and a transmission interval of the DTMF packets, the retransmission count representing how many times a terminal packet has been retransmitted, the terminal packet being a DTMF packet transmitted as a last packet of the DTMF event, the duration being represented by a time stamp since a start time of the DTMF event, the transmission interval being an interval of transmissions of packets;
    determining whether packet loss has occurred in the specific session;
    determining, by the packet analysis apparatus, by substantially eliminating an influence of the non-voice packets, whether loss packets are voice packets in accordance with received packets adjacent to the loss packets to count up a loss count of voice packets when the packet loss has occurred,
    determining whether the loss packets are preceded by a retransmitted packet of the terminal packet; and
    determining whether the loss packets are voice packets or DTMF packets in accordance with
        a location of the terminal packet and
        the retransmission count of the terminal packet
    when the loss packets are preceded by a retransmitted packet of the terminal packet,
    the location of the terminal packet being determined in accordance with a duration included in the retransmitted packet.

3. A method executed by a packet analysis apparatus for analyzing packets including voice packets and non-voice packets, the method comprising:
    capturing packets in a specific session;
    storing the captured packets in a storage;

screening the stored packets to count up a receipt count of voice packets in accordance with predefined characteristics of non-voice packets, wherein the non-voice packets are dual tone multiple frequency (DTMF) packets of a DTMF event, and the predefined characteristics of non-voice packets include at least one of a retransmission count of the DTMF event, a duration of each DTMF packet, and a transmission interval of the DTMF packets, the retransmission count representing how many times a terminal packet has been retransmitted, the terminal packet being a DTMF packet transmitted as a last packet of the DTMF event, the duration being represented by a time stamp since a start time of the DTMF event, the transmission interval being an interval of transmissions of packets, determining whether packet loss has occurred in the specific session;

determining, by the packet analysis apparatus, by substantially eliminating an influence of the non-voice packets, whether loss packets are voice packets in accordance with received packets adjacent to the loss packets to count up a loss count of voice packets when the packet loss has occurred, determining whether the loss packets are preceded by a DTMF packet other than a retransmitted packet of the terminal packet and succeeded by a voice packet; and determining, when the loss packets are preceded by a DTMF packet other than the retransmitted packet of the terminal packet and succeeded by a voice packet, that a loss count of DTMF packets is more than or equals to the retransmission count.

4. A method executed by a packet analysis apparatus for analyzing packets including voice packets and non-voice packets, the method comprising:

capturing packets in a specific session;

storing the captured packets in a storage;

screening the stored packets to count up a receipt count of voice packets in accordance with predefined characteristics of non-voice packets, wherein the non-voice packets are dual tone multiple frequency (DTMF) packets of a DTMF event, and the predefined characteristics of non-voice packets include at least one of a retransmission count of the DTMF event, a duration of each DTMF packet, and a transmission interval of the DTMF packets, the retransmission count representing how many times a terminal packet has been retransmitted, the terminal packet being a DTMF packet transmitted as a last packet of the DTMF event, the duration being represented by a time stamp since a start time of the DTMF event, the transmission interval being an interval of transmissions of packets;

determining whether packet loss has occurred in the specific session;

determining, by the packet analysis apparatus, by substantially eliminating an influence of the non-voice packets, whether loss packets are voice packets in accordance with received packets adjacent to the loss packets to count up a loss count of voice packets when the packet loss has occurred, calculating a transmission interval of loss packets in accordance with a difference in time and a sequence number between previous and next packets to the loss packets;

determining whether a first condition has been satisfied, the first condition being that the transmission interval of loss packets is identical with a transmission interval of voice packets and is not identical with a transmission interval of DTMF packets;

determining that the loss packets are voice packets when the first condition has been satisfied;

determining whether a second condition has been satisfied, the second condition being that the transmission interval of loss packets is not identical with the transmission interval of voice packets and is identical with the transmission interval of DTMF packets; and determining that the loss packets are DTMF packets when the second condition has been satisfied.

5. A method executed by a packet analysis apparatus for analyzing packets including voice packets and non-voice packets, the method comprising:

capturing packets in a specific session;

storing the captured packets in a storage;

screening the stored packets to count up a receipt count of voice packets in accordance with predefined characteristics of non-voice packets, wherein the non-voice packets are dual tone multiple frequency (DTMF) packets of a DTMF event, and the predefined characteristics of non-voice packets include at least one of a retransmission count of the DTMF event, a duration of each DTMF packet, and a transmission interval of the DTMF packets, the retransmission count representing how many times a terminal packet has been retransmitted, the terminal packet being a DTMF packet transmitted as a last packet of the DTMF event, the duration being represented by a time stamp since a start time of the DTMF event, the transmission interval being an interval of transmissions of packets;

determining whether packet loss has occurred in the specific session;

determining, by the packet analysis apparatus, by substantially eliminating an influence of the non-voice packets, whether loss packets are voice packets in accordance with received packets adjacent to the loss packets to count up a loss count of voice packets when the packet loss has occurred, obtaining a solution of a set of simultaneous equations when a transmission interval of voice packets differs from a transmission interval of DTMF packets, the set of simultaneous equations having as variables an amount of voice packets and an amount of non-voice packets out of packets to be calculated, the packets to be calculated including the loss packets and a packet that succeeds the loss packets; and calculating the loss count of voice packets and a loss count of DTMF packets in accordance with the solution of the set of simultaneous equations.

* * * * *